United States Patent [19]

Havlovick et al.

[11] Patent Number: 5,475,403
[45] Date of Patent: Dec. 12, 1995

[54] ELECTRONIC CHECKING WITH PRINTING

[75] Inventors: Ron G. Havlovick, Dallas; William C. Smith, Garland, both of Tex.

[73] Assignee: Personal Electronic Products, Inc., Dallas, Tex.

[21] Appl. No.: 981,821

[22] Filed: Nov. 25, 1992

[51] Int. Cl.⁶ .......................... G01D 15/18; G06F 15/30; B41J 2/01
[52] U.S. Cl. .................. 346/134; 347/2; 347/37; 347/104; 347/109; 364/406; 364/408; 364/705.03; 400/185; 400/328
[58] Field of Search ............... 346/134, 139 R, 346/140 R, 143, 75; 364/401, 406, 408, 705.01, 705.02, 705.06, 710.01, 710.04, 705.03; 235/379, 58 CW, 58 CF, 58 P; 400/185, 187, 328, 568; 347/2, 7, 87; 347/37, 104, 109

[56] References Cited

U.S. PATENT DOCUMENTS

| | | | |
|---|---|---|---|
| 3,606,973 | 9/1971 | Davis | 346/75 |
| 4,053,735 | 10/1977 | Foudos | 235/61.9 |
| 4,075,702 | 2/1978 | Davies | 364/705 |
| 4,096,577 | 6/1978 | Ferber et al. | 364/712 |
| 4,195,938 | 4/1980 | Velazquez | 400/328 X |
| 4,222,109 | 9/1980 | Siwula | 364/715 |
| 4,224,675 | 9/1980 | Pinkerman | 364/705 |
| 4,308,588 | 12/1981 | Siwula | 364/715 |
| 4,329,698 | 5/1982 | Smith | 347/87 X |
| 4,436,439 | 3/1984 | Koto | 400/328 X |
| 4,459,052 | 7/1984 | Lundblad | 400/124 |
| 4,506,276 | 3/1985 | Kyser et al. | 347/7 X |
| 4,551,734 | 11/1985 | Causley et al. | 346/140 R |
| 4,591,875 | 5/1986 | McCann | 346/75 |
| 4,623,965 | 11/1986 | Wing | 364/408 |
| 4,724,527 | 2/1988 | Nishimura et al. | 364/705 |
| 4,737,911 | 4/1988 | Freeman, Jr. | 364/401 |
| 4,911,476 | 3/1990 | Garza | 281/29 |
| 5,025,373 | 6/1991 | Keyser, Jr. et al. | 364/408 |
| 5,060,979 | 10/1991 | Garza | 281/31 |
| 5,093,787 | 3/1992 | Simmons | 364/406 |
| 5,135,259 | 8/1992 | Garza | 281/29 |
| 5,140,344 | 8/1992 | Tsukada et al. | 346/139 R |
| 5,226,743 | 7/1993 | Jackson et al. | 400/185 X |

FOREIGN PATENT DOCUMENTS

| | | | |
|---|---|---|---|
| 501633 | 9/1992 | European Pat. Off. | |
| 56-40565 | 4/1981 | Japan | |
| 2140746 | 12/1984 | United Kingdom | 400/185 |

*Primary Examiner*—Benjamin R. Fuller
*Assistant Examiner*—Alrick Bobb
*Attorney, Agent, or Firm*—Baker & Botts

[57] ABSTRACT

An electronic checkbook (10) is provided for printing checks. electronic checkbook (10) is of a hand-held size and operates on two AAA batteries. An on/off switch (30) which includes a needle valve (410) controls ink flow. A print cap switch (26) is also provided for rugged applications. Checks are advanced under a printhead (38). The printhead (38) and a roller shaft (46) for advancing the checks are both driven by a single motor (56). A transmission (54) translates power from the motor (56) to the printhead (38) and the roller shaft (46). The position of both the motor (56) and the printhead (38) are sensed by use of a single LED (124) and photodetector (128). Ink is supplied to the printhead (38) from an ink cartridge (12). Data is stored in a non-volatile check register (16). Reconciliation of transactional information can be made by reference to information stored on a statement strip (20).

30 Claims, 15 Drawing Sheets

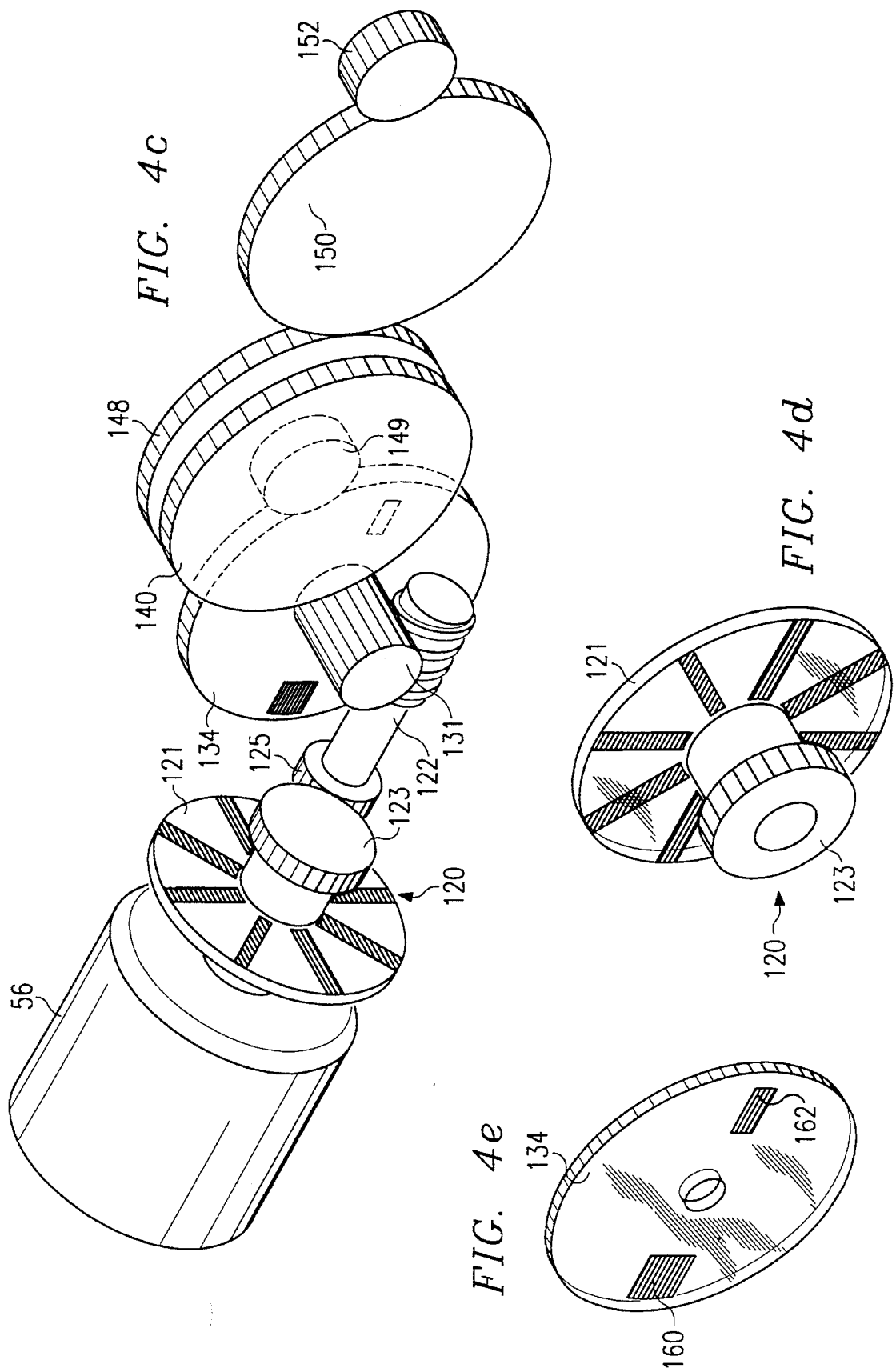

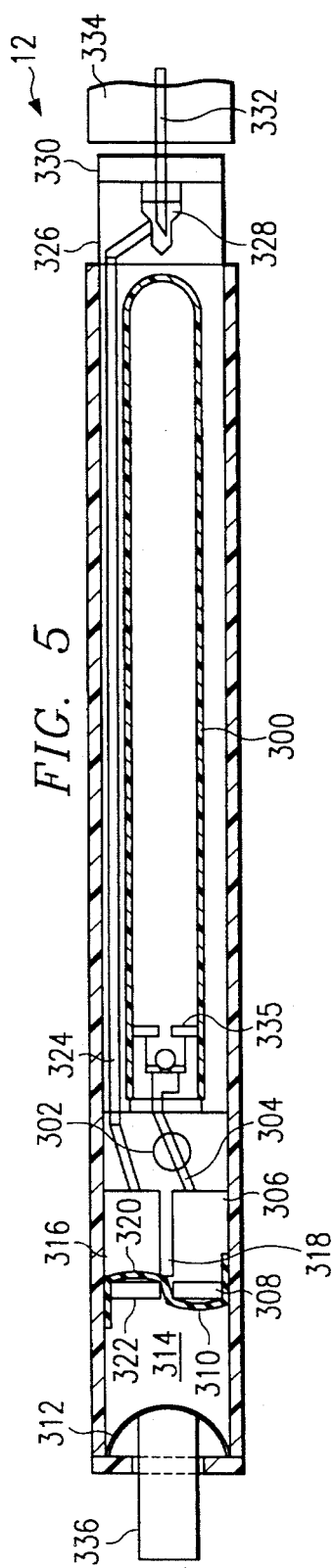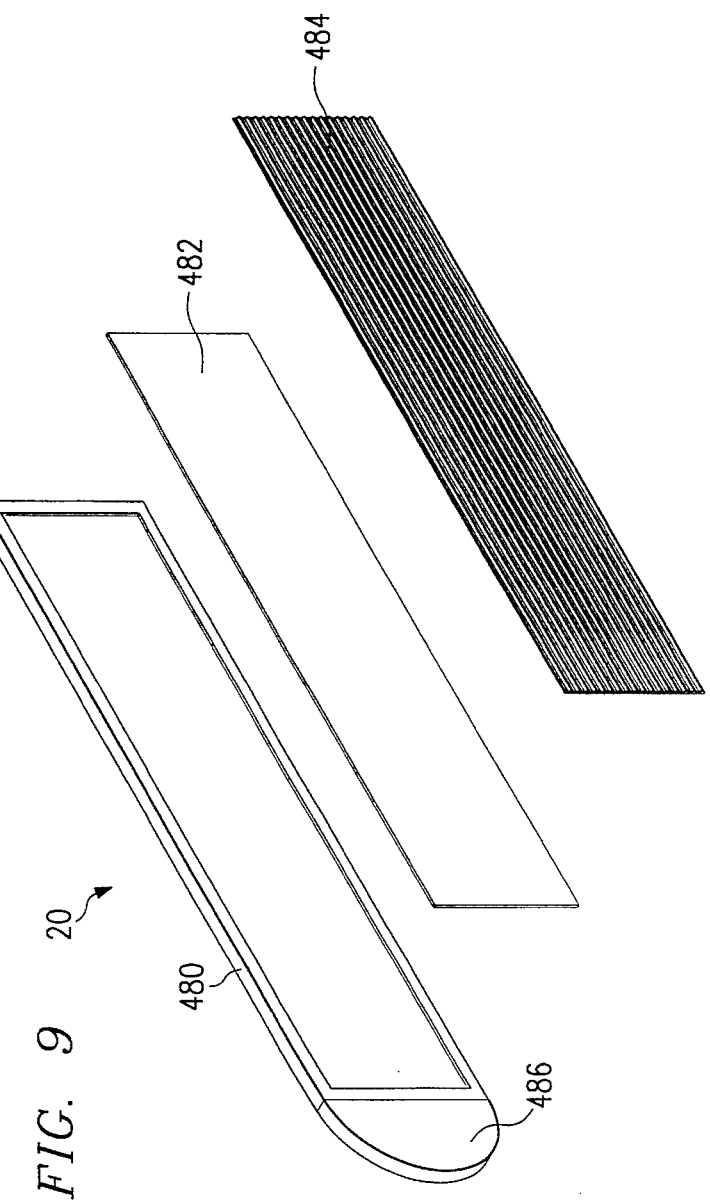

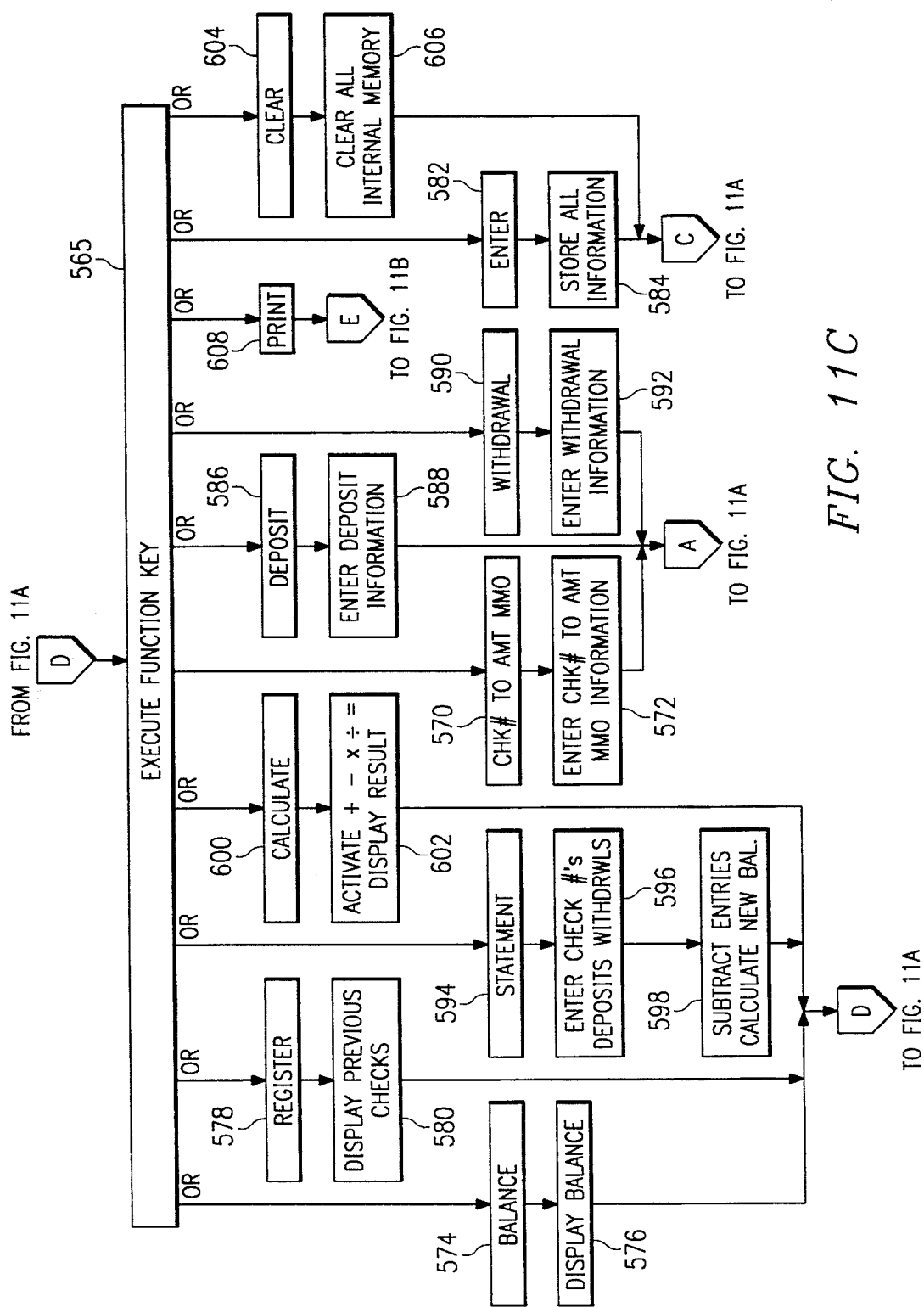

ELECTRONIC CHECKING WITH PRINTING

TECHNICAL FIELD OF THE INVENTION

This invention relates generally to electromechanical devices, and more particularly to electronic checking with printing.

BACKGROUND OF THE INVENTION

The downscaling of product sizes is one of the most important considerations in the development of electronic products. For example, the acceptability, and therefore success, of many products, such as laptop computers, hand-held computers, portable printers, and a myriad of other hand-held consumer electronic products, is directly dependent upon their relatively miniature size and light weight.

In products that require printing capabilities, perhaps the most significant limitation to downsizing is the printing mechanism, even though relatively small sized printing technologies exist, such as thermal, electro-sensitive, impact, inkjet, pen based, xerographic, magnetic, and thermal-transfer. Unfortunately, the reliability and speed of systems incorporating such technologies diminish as they are downscaled to the size of handheld electronic products. Furthermore, the low quality of the print from certain technologies, such as thermal and electro-sensitive printing, presents a significant drawback. These technologies are also unattractive because of their requirement for special paper.

Many other considerations are relevant to the success of miniature printing in hand-held electronic products. For example, hand-held electronic products incorporating printing systems demand very low power and very light weight, in addition to the already mentioned need for highly reliable quality printing. For instance, impact, x-y pen based, xerographic, or magnetic printing technologies, can be made to a miniature scale, but draw large amounts of current requiring the use of C size, D size or rechargeable batteries. Also, their size and weight are prohibitive due to the nature of hand-held electronic products. Thermal transfer, though much smaller, still demands high current, therefore requiring larger batteries, thus increasing both size and weight.

Another requirement for acceptability is ease of replacement of various parts. For example, replaceable ink cartridges or ribbons must be easily accessible and user replaceable. Also, these ink cartridges or ribbons must be designed for easy handling and not have requirements for special tools, and must not soil the user during replacement.

A particular application for miniature printing mechanisms in which these demands must be met is that of electronic checkbooks. With an electronic checkbook, transactional data is entered into the unit and checks are printed with the transactional data, including the amount of purchase, payee, date, and other data, such as a memorandum. The check is then ejected for the signature of the check writer. An electronic checkbook also keeps an electronic record, or register, of all transactions made. To date, no electronic checkbook exists that includes a printing mechanism capable of meeting the requirements of very low power, high quality, high reliability, easy maintenance and miniature size.

An example of a printing mechanism used in an electronic checkbook is disclosed in U.S. Pat. No. 4,623,965 issued Nov. 18, 1986 to Donald K. Wing. The printing mechanism disclosed in the Wing patent discloses a print mechanism using an ink pad and pen driven by three motors for writing information on a check. The use of these three motors and the spans required in that patent require relatively significant amounts of power to operate, and the unit is relatively large. Furthermore, the ink pad and pen disclosed provide relatively low quality printing as opposed to other technologies, such as inkjet printing. Moreover, the reliability of the printing mechanism disclosed in Wing is diminished as there is no stated feedback mechanism for determining the exact location of the printing stylus.

Therefore, a need has arisen for a printing mechanism for use in hand-held electronic products, such as an electronic checkbook, that operates on very low power with high printing reliability and high print quality. Furthermore, a need has arisen for an electronic checkbook with such a printer.

SUMMARY OF THE INVENTION

In accordance with the teachings of the present invention, an electronic checkbook and miniature printer is provided which substantially eliminates and reduces disadvantages and problems associated with prior art systems.

In particular, an electronic checkbook is provided with a case including a cavity for storage of a plurality of checks. An input device integral with the case is provided for inputting information to the electronic checkbook, including information for writing checks. A display device, also integral with the case, is provided for displaying data input to or generated by the electronic checkbook. A printing mechanism for printing and advancing checks is provided which includes a single motor and motor shaft, operable to turn in two directions. A printhead for printing on the checks is translationally engaged on a printhead shaft, such that rotation of the printhead shaft causes translation of the printhead. A roller shaft extends over the checks, such that rotation of the roller shaft advances checks under the printhead. A transmission is coupled to the motor shaft, the printhead shaft, and the roller shaft, such that the printhead shaft rotates only when the motor shaft is turning in the first direction and the roller shaft rotates only when the motor shaft is turning in a second direction. Position sensing means is operable to sense the position of both the printhead shaft and motor shaft. Furthermore, an electronic control system, which includes a microcontroller and a memory, controls the printing mechanism, the input device, the display device, all sensing devices and maintains transactional records associated with the checks in a removable memory. The electronic control system operates to control the printing mechanism based in part on the position sensing means.

In a particular embodiment, the printhead is an inkjet printing printhead. In still another embodiment, ink is supplied to the printhead from a replaceable ink cartridge that inserts into the case.

Furthermore, the printing mechanism is disclosed in detail.

An important technical advantage of the present invention is the fact that use of a single motor allows for lightweight and very low power printing in consumer hand-held electronic products, such as an electronic checkbook. Another important technical advantage of the present invention is the fact that high quality printing, such as that from an inkjet printhead, is realized in a light weight and miniature mechanism.

A still further important technical advantage of the present invention is the fact that a single position encoding device provides position information on both the motor used to drive the printing mechanism and the printhead shaft, as well as check movement.

BRIEF DESCRIPTION OF THE DRAWINGS

For a more complete understanding of the present invention and the advantages thereof, reference is now made to the following description taken in conjunction with the accompanying drawings in which like reference numbers are indicated in like figures and wherein:

FIGS. 4a through 4e illustrate various views of a particular embodiment of a printhead drive and check advancing mechanism according to the teachings of the present invention;

FIG. 5 illustrates a particular embodiment of an ink cartridge according to the teachings of the present invention;

FIG. 9 illustrates an exploded view of a particular embodiment of a statement strip according to the teachings of the present invention;

DETAILED DESCRIPTION OF THE INVENTION

The preferred embodiments of the present invention are illustrated in FIGS. 1 through 11 of the drawings, like numerals being used to refer to like and corresponding parts of the various drawings.

The present invention includes an electronic checkbook 10. An electronic checkbook 10 is a device for printing checks with all relevant information, such as amount of check, date, payee, and any memorandum, for ejecting the check for signature by the drawer or payor, for storing entered information, and for reconciling transactional information with data from a financial institution. The electronic checkbook 10 disclosed herein is capable of very low power operation, high speed, and quality printing of checks. Furthermore, the electronic checkbook 10 disclosed herein maintains all financial information related to checks in a removable memory, and is able to reconcile that information with information from a bank on which the checks are drawn. The electronic checkbook 10 disclosed herein is also able to perform calculator functions.

Figure 1:
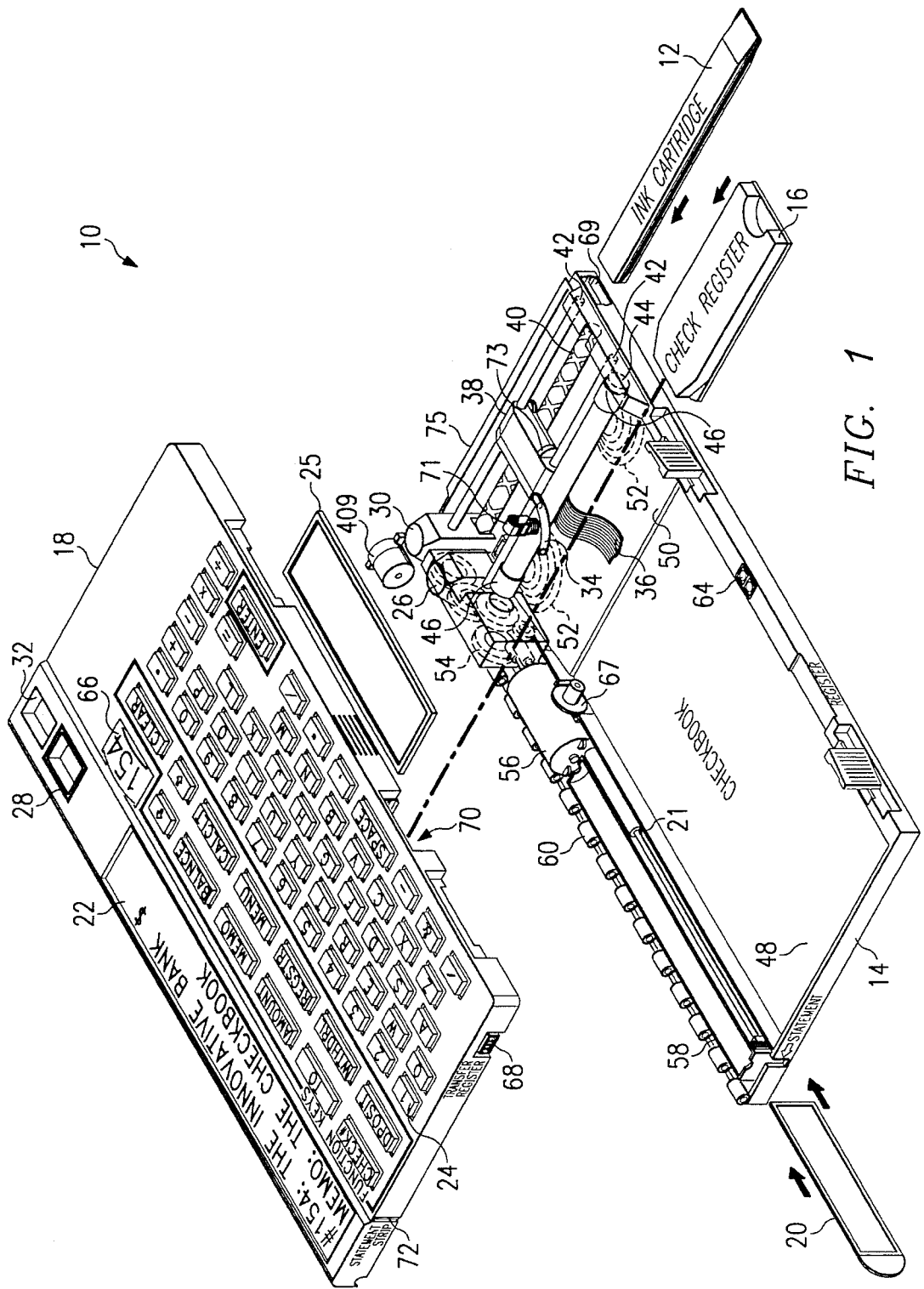
FIG. 1 is a partially exploded view of an electronic checkbook and printing mechanism according to the teachings of the present invention.

FIG. 1 illustrates a partially exploded view of an electronic checkbook 10 including a printing mechanism according to the teachings of the present invention. The details of the printing mechanism will be discussed in connection with FIGS. 2 through 7. In a particular embodiment, the outside dimensions of electronic checkbook 10 are 6½ inches long by 3½ inches wide by ½ inch deep. This small size is heretofore unachievable in the industry.

Components of the Electronic Checkbook 10 in General

An ink cartridge 12, to be discussed below in detail, is slidably and removably engaged to a bottom case 14 of electronic checkbook 10. The ink cartridge 12 is a housing formed of a material such as plastic for supplying ink for the printing mechanism. A check register 16 is slidably and removably coupled to a top case 18 of electronic checkbook 10. The check register 16 is a non-volatile serial electrically erasable programmable read only memory (EEPROM) and housing for storing information entered into electronic checkbook 10. Other memories, such as battery backed RAM, may also be used without departing from the intended scope herein. The top case 18 is also integral with a printed circuit board which holds electronic components to be discussed.

A statement strip 20, also shown in FIG. 1, is slidably and removably engaged to top case 18 and bottom case 14. The statement strip 20, to be discussed in detail below, is a recording strip used for reconciliation of checking accounts. In this particular embodiment, a dashpot 21 is used to control the speed of statement strip 20 as it is passed by a reading head. However, depending on the type of storage, medium, and storage density used for statement strip 20, dashpot 21 may or may not be required. By controlling speed by dashpot 21, greater density and less reading errors can be obtained from statement strip 20. As the statement strip 20 is inserted, the dashpot 21 slowly retracts into itself, thereby allowing room for the statement strip itself.

Top case 18 also includes a liquid crystal display 22. LCD display 22 is for displaying all information entered into electronic checkbook 10 for a check, balance information, information stored in check register 16, various menu functions, alarm conditions and actions to be taken, user instructions, and calculator functions.

An input device 24 is shown integral with top case 18. A signature pad 25 may also be included, which allows pen based input of a signature that is read by x-y mapping and stored for printing on the check. Such a pad may be pressure sensitive, resistive, optical, or other known script sensing technologies. In a particular embodiment, input device 24 may comprise a keyboard. Input device 24 may also comprise other input devices, such as a pen based input, without departing from the intended scope of the present invention. Input device 24 is for entering check related information and to query the electronic checkbook 10. As shown in FIG. 1, input device 24 includes a plurality of function keys. These function keys, to be described in connection with the software, allow user input of various information related to checking transactions, including calculator functions. The functions illustrated are not intended to be exhaustive, it being understood that other functions can be included without departing from the intended scope herein.

A print cap switch 26, to be described below, is provided for initiating printing. Print cap switch 26 extends through upper case 18 at opening 28.

An on-off switch 30, to be discussed below, powers up and enables printing from the electronic checkbook 10. On-off switch 30 extends through upper case 18 through on-off switch opening 32.

An ink tube 34 and printhead cable 36 supply ink and power and logic control to a printhead 38. In general, printhead 38 is used for printing information onto checks. Printhead 38 is translationally coupled to a printhead shaft 40, which in a particular embodiment is a helical shaft. Printhead shaft 40 supports the printhead 38 and allows bi-directional travel of the printhead 38. The mechanism by which printhead shaft 40 is driven will be discussed below. Support shafts 42 are also included to support the printhead 38 on both sides of printhead shaft 40 to insure that printhead 38 is maintained parallel and perpendicular to the face of the check during translational movement.

A roller shaft 44 and rollers 46 are included to advance checks under the printhead 38 and to advance checks out of electronic checkbook 10. Rollers 46 are placed uniformly across roller shaft 44 to ensure no roller shaft deformation or check paper bowing. Checks are stored in check cavity 48 and fed to printhead 38 by roller shaft 44 and rollers 46. A check pressure plate 50 and spiral springs 52, and check guide 53 hold checks under the rollers at constant pressure. This insures single check feeding, no paper bowing and no roller slipping. Spiral springs are used to insure that when the springs are 100% compressed, the springs occupy no more space than a single coil.

A transmission 54 is provided to translate power from a single motor 56 and its motor shaft 57 to printhead 38 via the printhead shaft 40. Transmission 54 and motor 56 will be described in detail below. Power is supplied to motor 56 through batteries, and in a particular embodiment two AAA 1.5 volt batteries. These batteries are held in battery cavity 58. It should be understood, that other batteries, such as lithium cells, rechargeable batteries, and external power sources can be used without the departing from the intended scope of the present invention. However, the ability of the present invention to make use of miniature size and very light weight of AAA batteries provides an advantage heretofore unknown in the industry.

A case hinge 60 is used to hold top case 18 and bottom case 14 at a hinged point for opening and closing. In this manner checks can be stored within check cavity 48. A case open sensor 64 senses when top case 18 and bottom case 14 are open. Sensor 64 is used to stop printing and return printhead 38 to a home position if electronic checkbook 10 is opened, to prevent damage to printhead cable 36 which transmits control signals to printhead 38.

A check movement sensor 67 is also provided which includes a roller wheel ganged to an encoding wheel. An LED 65 and photodetector 69 (shown in FIG. 10) are used to pass and detect light through the encoding wheel as the roller wheel is rotated by the advancement of checks. This sensor 67 is used to detect check jams by monitoring movement of the encoding wheel.

A check home position sensor 71 is provided for ensuring that a check to be printed is in a home position, just beneath printhead 38. Sensor 71 is a switch that is closed when a check passes over it. A check field sensor 73 is also provided for sensing the location of information fields on checks, thus providing information on where characters should be printed. In a particular embodiment, sensor 73 is an infrared LED and photodetector unit that senses dark lines by reflection and absorption of the infra-red light, and is located on printhead 38.

Several other features are apparent from FIG. 1. For example, a check number view port 66 is provided to view the check number so as to allow the user to enter the check number into the electronic checkbook 10 before printing. A transfer port 68 is also provided as a communications connection for transmitting and receiving information from or to other peripheral equipment. For example, other electronic checkbooks according to the present invention, may be coupled together through the transfer port for various balancing operations. Several openings are also apparent from the FIG. 1. For example, check register opening and cavity 70 provides an opening for the check register 16. Likewise, statement strip opening and cavity 72 allows for insertion of the statement strip 20. Ink cartridge opening and cavity 69 allows for entry and storage of the ink cartridge 12. Similarly, a check opening 75 is provided out of which checks are advanced.

The Printhead

Figure 2:
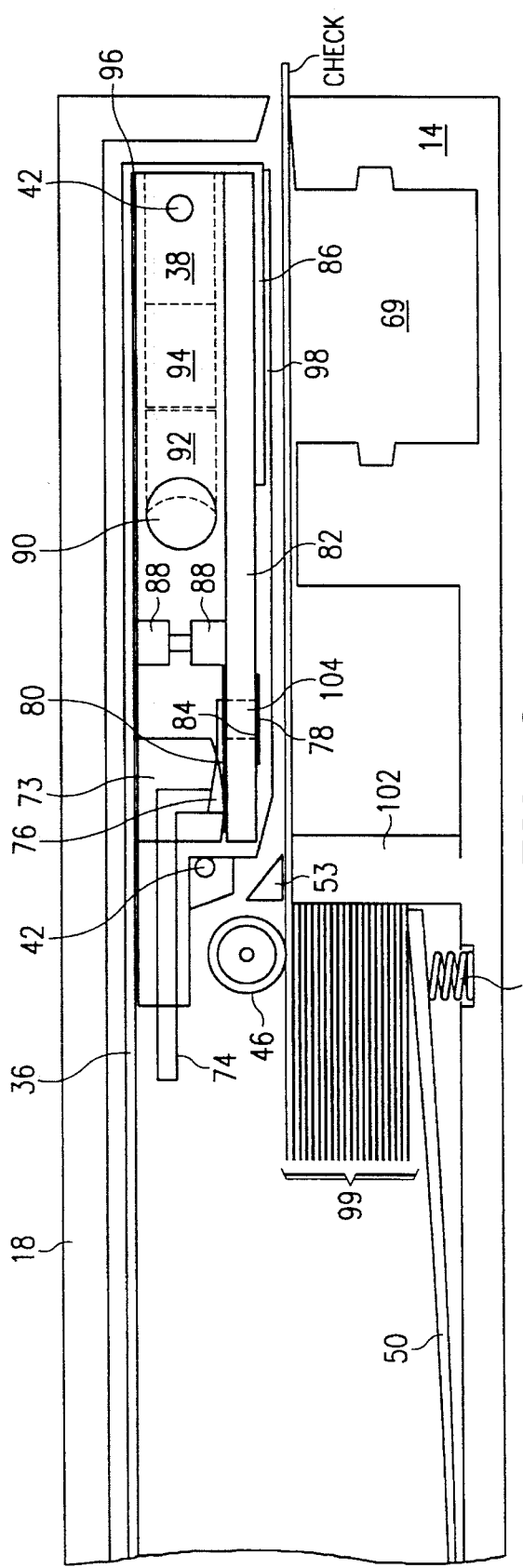
FIG. 2 is a side view of a particular embodiment of a printhead according to the teachings of the present invention.

FIG. 2 is a side view of the printhead 38 and related elements. The printhead 38 is a housing which includes various elements required for printing. In a particular embodiment, printhead 38 includes a glass inkjet printing device. Inkjet printing is desirable because of its high quality, relatively high speed, and ability to operate on very low power. Printhead 38 is driven by the transmission 54 to be discussed below.

Ink is fed through the ink tube 34 to ink tube attachment 74. Ink travels within ink tube attachment 74 to an ink reservoir 76. Ink is fed to the ink reservoir 76 by constant pressure from ink cartridge 12. Ink from ink reservoir 76 is fed through ink filter sensor plate 80, through printhead glass inkhole 104 to ink sensor orifice plate 84 which directs the ink to inkjets 78. Inkjets 78 are formed within the ink sensor orifice plate 84 below printhead glass 82 as is generally known in the thermal inkjet printing art.

Ink filter sensor plate 80 filters any particulate from the ink, and is electrically active and serves as the positive plate for the sensing of ink between it and ink sensor orifice plate 84. Ink within inkjets 78 is boiled by thermal resistors which are affixed to printhead glass 82 above inkjets 78 and which are powered through printhead electrical contacts 86. The boiled ink is ejected through inkjets 78. The ejection of the ink is in the form of a dot on the check.

The ink filter sensor plate 80 may be composed of stainless steel mesh and is electrically connected to the ink filter sensor plate electrical connection 88, which is connected to a variable oscillator, to be discussed below, such that the oscillator's frequency is directly proportional to the presence or absence of ink. Ink filter sensor plate 80, in combination with ink sensor orifice plate 84, forms a sensor for determining when ink is in printhead 38. Ink presence can be sensed in other ways as well, such as by detecting a current, or through optical or other means. If ink is not present, an alarm will be sounded so that the user can prime ink cartridge 12 and deliver ink to printhead 38. A micropump or other means may also be used, such that ink can automatically be pumped upon detection of ink voids. Ink sensor orifice plate 84 also acts as a recipient of a standing electrical wave transmitted through the ink in ink tube 34 from ink cartridge 12, as will be discussed below. This standing wave allows molecular oscillation of the ink thereby lowering its freezing point and allowing for operation in low temperature. This standing wave also acts to detect the presence of air within ink tube 34, such that if air is present within ink tube 34, the frequency of the standing wave will change, indicating the ink void. Ink presence can be sensed in other ways as well, such as by detecting a current.

A hole 90 is provided through printhead 38 for printhead shaft 40. A helix dog 92 forms the guide pin for printhead shaft 40. Helix dog 92 rests within printhead shaft 40 and allows movement of printhead 38 when printhead shaft 40 rotates. In effect, helix dog 92 provides linear translation to printhead 38 from rotation of printhead shaft 40. Helix dog 92 is secured by a set screw or plug 94 which pushes helix dog 92 to a fixed location for meshing with printhead shaft 40.

Printhead cable 36 is coupled to printhead 38. It may be secured by, for example, cable epoxy 96. As can be seen from FIG. 2, printhead cable 36 is encapsuled by printhead cable encapsulant 98. Control signals for printing are transmitted to printhead 38 through printhead cable 36.

A stack of checks 99 is stored over check pressure plate 50. These checks are moved, one at a time, under printhead 38 by check rollers 46. A check guide 53 allows each check to be fed beneath printhead 38 parallel to the bottom of printhead 38. Furthermore, the distance between check guide 53 and check cavity front wall 102 is such that only one check may pass through at a time.

Figure 3:
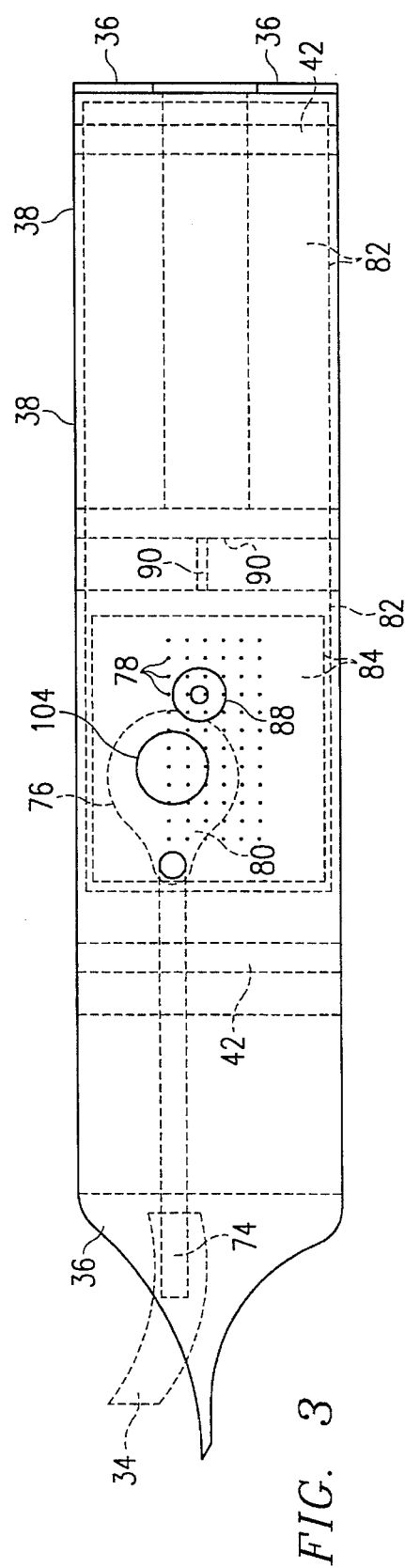
FIG. 3 is a top view of a particular embodiment of a printhead according to the teachings of the present invention.

FIG. 3 is a top view of printhead 38. As can be seen from FIG. 3, printhead glass 82 is enclosed within printhead 38. Furthermore, it can be seen that ink is transferred from ink reservoir 76 to inkjets 78 through printhead glass inkhole 104. Ink reservoir 76 and printhead glass inkhole 104 allow only a selected amount of ink to be fed through ink sensor orifice plate 84 and to inkjets 78. This reduces the weight of the ink on ink sensor orifice plate 84, such that, in conjunction with ink cartridge 12, no ink emanates from ink sensor orifice plate 84, even under changing environmental, shock, or impact conditions, unless the thermal resistors above the inkjets are energized.

The Printhead Drive And Check Advancing Mechanism

Figure 4A:
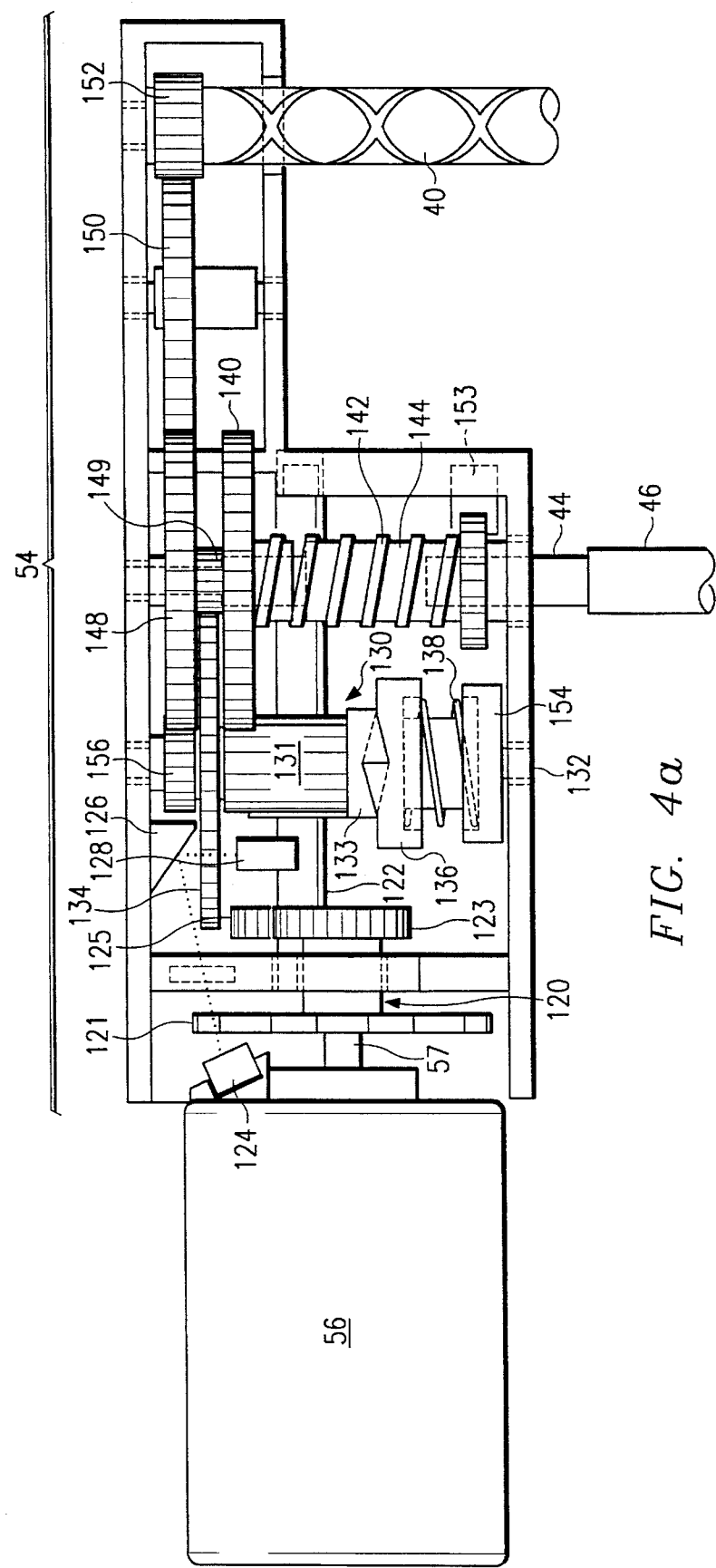
Figure 4B:
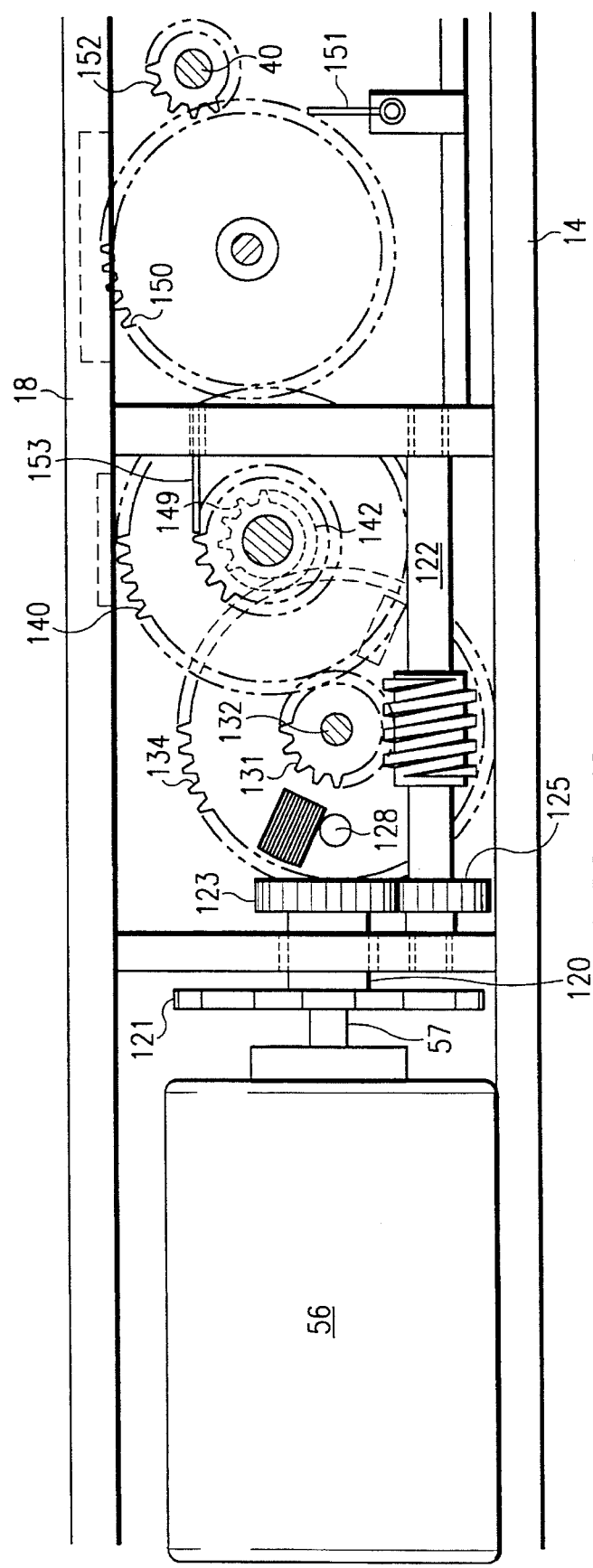

FIGS. 4a and 4b illustrate top and side views of a particular embodiment of a printhead drive and check advancing mechanism according to the present invention. FIG. 4c illustrates an isometric view of a portion of the gear train of the same embodiment. The printhead drive and check advancing mechanism operates both to move the printhead 38 back and forth along the printhead shaft 40, and to advance checks by rotation of the roller shaft 44. A single motor 56 is used to drive both operations. Motor 56 causes rotation of motor shaft 57. It should be understood that when it is stated that motor 56 turns or rotates, it is meant that motor shaft 57 turns or rotates. Motor 56 is operable to turn in two directions, and transmission 54 is coupled to motor 56 such that printhead 38 is driven by printhead shaft 40 when motor 56 turns in one direction. When motor 56 turns in the other direction, checks are advanced by roller shaft 44. The structure and operation of both printhead 38 movement and check advancing will be discussed in turn below.

A motor encoder assembly 120 couples the motor shaft 57 of motor 56 to a worm assembly 122. Motor encoder assembly 120 is also shown in FIG. 4d and includes motor encoding wheel 121 and a motor pinion gear 123. Motor encoder assembly 120 is a molded single piece assembly, and may be made of plastic. Coupling to the worm assembly 122 occurs by meshing of motor pinion gear 123 to a worm pinion gear 125. This meshing occurs with motor 56 turning in either direction. LED 124 emits light through motor encoding wheel 121 which is then reflected off reflector 126 onto photodetector 128. By detecting the pulses received from photodetector 128, a microcontroller, to be discussed below, can determine the position of motor shaft 57. The particular description of motor encoding wheel 121 will be provided below.

Worm assembly 122, which includes worm pinion gear 125, is a single piece assembly, and drives a worm ratchet assembly 130. Worm ratchet assembly 130 includes a worm gear 131 which is driven by worm assembly 122. Worm ratchet assembly 130 also includes one-way drive ratchet 133.

Worm ratchet assembly 130 is centered on ratchet shaft 132 as is printhead encoding gear 134. The light from LED 124 emits through motor encoding wheel 121, reflects off reflector 126 and passes through printhead encoding gear 134 before impinging on photo-detector 128. Printhead encoding gear 134 is used to determine the position of printhead 38 on printhead shaft 40. Printhead encoding gear 134 does not rotate with ratchet shaft 132, as will be discussed.

A ratchet pawl assembly contains a ratchet pawl disk 136 and a ratchet pawl spring 138. Ratchet pawl disk 136 engages with one-way drive ratchet 133 when motor 56 is turning in one direction. When motor 56 is turning in the other direction, ratchet pawl disk 136 will not engage with one-way drive ratchet 133. When ratchet pawl disk 136 engages, it causes rotation of ratchet shaft 132. With this rotation, ratchet pawl spring 138 and ratchet pawl spacer 154 also rotate. Ratchet pawl spring 138 maintains pressure against ratchet pawl disk 136 such that ratchet pawl disk 136 remains engaged with one-way drive ratchet 133. Ratchet pawl spacer 154 is coupled to ratchet shaft 132. Rotation of ratchet shaft 132, through idler gears to be discussed, turns printhead shaft 40.

Roller shaft 44 is used to advance checks, and rotates when motor 56 is turning in the other direction than that used to rotate ratchet shaft 132. To accomplish this, a roller drive spur gear 140 and roller drive wrap spring 142 are centered around a roller clutch axle assembly 144. Roller clutch axle assembly 144 drives roller shaft 44. Roller drive spur gear 140 is driven by worm gear 131.

Roller drive wrap spring 142 attaches to roller drive spur gear 140 and is centered about roller clutch axle assembly 144. As roller drive spur gear 140 rotates so does roller drive wrap spring 142. As roller drive wrap spring 142 rotates, in the correct rotation for advancing checks, roller drive wrap spring 142 tightens and engages roller clutch axle assembly 144, thereby rotating roller clutch axle assembly 144. As roller clutch axle assembly 144 rotates so does roller shaft 44, and thus rotates rollers 46 advancing a check.

Printhead idler gear 148 and printhead encoding pinion gear 149 are also centered about roller clutch axle assembly 144. Printhead idler gear 148 is used for spacing for printhead shaft 40 from roller shaft 44, and printhead encoding pinion gear 149 meshes with and drives printhead encoding gear 134.

Printhead idler gear 148 is centered about roller clutch axle assembly 144 as shown in FIG. 4a, but does not rotate with roller clutch axle assembly 144. Printhead idler gear 148 is rotated by ratchet shaft pinion gear 156, centered on ratchet shaft 132. Printhead idler gear 150 meshes with printhead idler gear 148 and printhead shaft pinion gear 152. Printhead shaft pinion gear 152 fits onto printhead shaft 40.

The operation of the above-described mechanism is such that when motor 56 turns in one direction, roller shaft 44 will rotate, and when motor 56 is turned in the other direction, printhead shaft 40 will rotate causing translation of printhead 38. Furthermore, the motor encoding wheel 121 and printhead encoding gear 134 encode motor 56 position and printhead 38 home and far side positions, as will be discussed.

Clockwise direction of motor 56 rotates motor encoder assembly 120, causing worm assembly 122 to rotate in the opposite direction, thus engaging worm gear 131 of worm ratchet assembly 130. Ratchet pawl disk 136 can mesh with one-way drive ratchet 133 of worm ratchet assembly 130 in only one direction. Thus, when one-way drive ratchet 133 is rotating in this one direction, it will engage ratchet pawl disk 136. Ratchet pawl disk 136 is held against one-way drive ratchet 133 by ratchet pawl spring 138. Ratchet pawl disk 136 has a spline center so that when it rotates it will engage with ratchet shaft 132.

Ratchet shaft 132 now rotates the same direction as ratchet pawl disc 136. Ratchet pawl spacer 154 is used as an anchor point for ratchet pawl spring 138, which keeps spring pressure against ratchet pawl disc 136 while one-way drive ratchet 133 is turning in the appropriate direction.

With ratchet shaft 132 rotating, ratchet shaft pinion gear 156 rotates in the same direction. Ratchet shaft pinion gear 156 meshes with printhead idler gear 148, which meshes in turn with printhead idler gear 150, which in turn rotates printhead shaft pinion gear 152 and printhead shaft 40. Thus, with clockwise rotation of motor 56, printhead shaft 40 rotates, and therefore printhead 38 moves.

Printhead shaft idler gear 148 is attached to printhead encoding pinion gear 149, and thus printhead encoding pinion gear 149 rotates with printhead shaft idler gear 148. Since printhead encoding pinion gear 149 drives printhead encoding gear 134, printhead encoding gear 134 rotates with printhead shaft 40. With this motion, photodetector 128 senses light through the spokes of motor encoding wheel 121 and through the holes of printhead encoding gear 134. Motor encoding wheel 121 modulates the light from LED 124. Printhead encoding gear 134 modulates this same light from LED 124 via reflector 126. These two separate modulations create an amplitude modulated electrical signal, which at one level is detecting motor encoding wheel 121 and at second level is detecting printhead encoding gear 134.

Figures 4F, 4G:
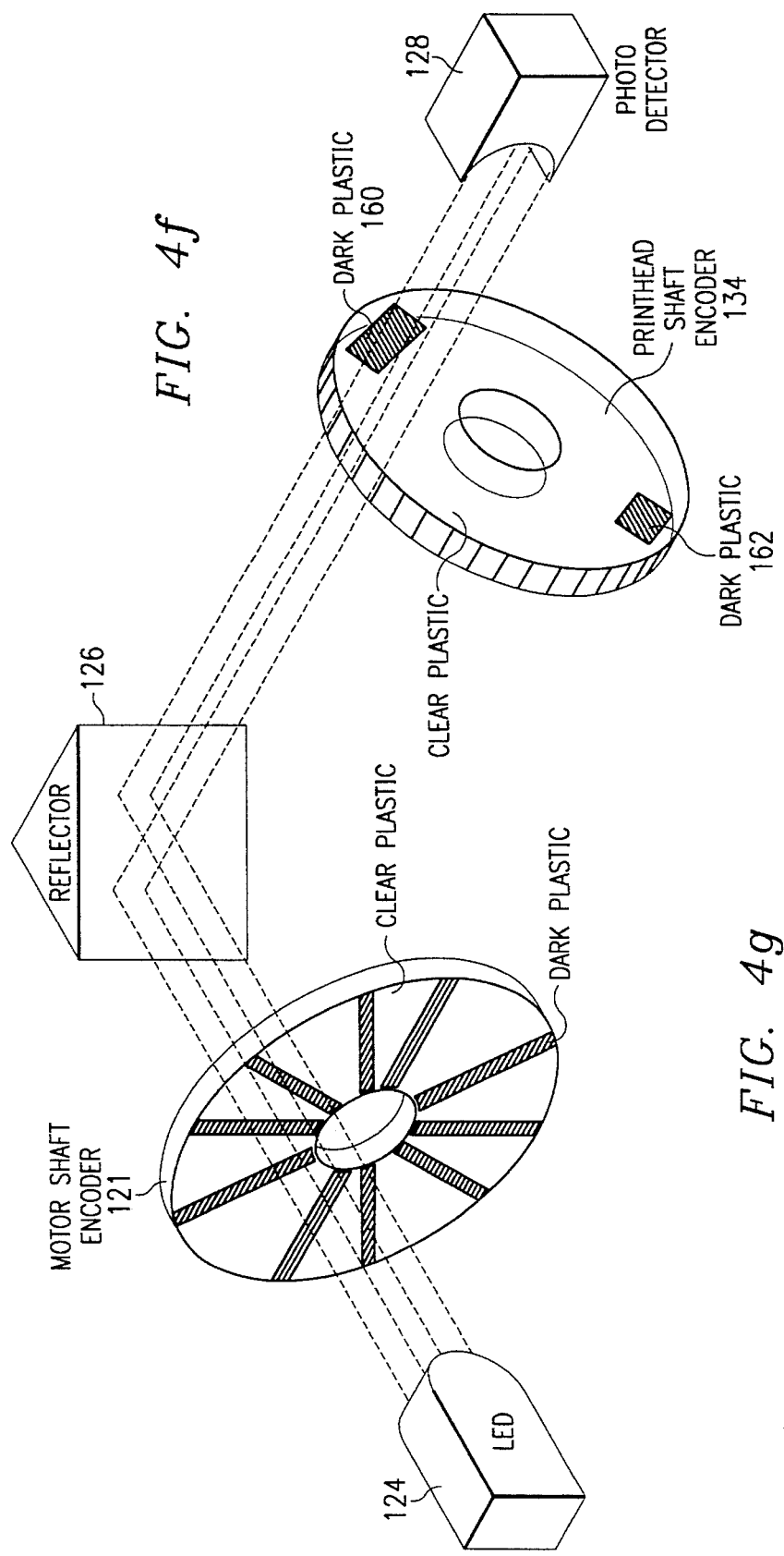
FIGS. 4f through 4g illustrate an encoding device constructed according to the teachings of the present invention.

FIGS. 4*f* and 4*g* illustrate the operation of motor encoding wheel 121, printhead encoding gear 134, and resulting waveforms. As shown in FIG. 4*g*, the amplitude of the light passing through motor encoding wheel 121 and printhead encoding gear 134 varies with the opacity of these encoders. This information is read by a microcontroller, to be discussed, and information on the position of motor shaft 57 and printhead shaft 40 is provided. Thus, only the single photodetector 128 and LED 124 are required for both sets of information. It should be understood that other position sensing devices may be used without departing from the intended scope herein. For example, mechanical switches could be used to sense end positions of printhead 38. As another example, a single encoding wheel or other device could be used to sense the position of both motor shaft 57 and printhead 38.

Printhead shaft 40 operates such that with motor 56 turning in one direction, printhead 38 translates from one end of printhead shaft 40 to the other end and then back to the first end, and then repeats this process as printhead shaft 40 continues to rotate. Thus, printhead 38 can move back and forth along printhead shaft 40 while motor 56 is turning in only one direction. Motor 56 is also used to drive rollers 46 which drive the check under printhead 38 and out of electronic checkbook 10. The following is a discussion of roller operation.

With motor 56 rotating in the opposite direction from that described above, motor encoder assembly 120 rotates in the same direction as motor 56. This rotation results in rotation of worm assembly 122 and worm ratchet assembly 130. However, since worm ratchet assembly 130 is rotating in the opposite direction from that described above, ratchet pawl disk 136 will not engage with one-way drive ratchet 133 of worm ratchet assembly 130. Therefore, ratchet shaft 132 will not rotate, and thus neither will printhead shaft 40.

As worm gear 131 of worm ratchet assembly 130 rotates, it rotates roller drive spur gear 140 and roller drive wrap spring 142. Roller drive wrap spring 142 is oriented such that when motor 56 is rotating in the counter-clockwise direction, it tightens against splined roller clutch axle assembly 144. This causes roller clutch axle assembly 144 and roller drive wrap spring 142 to rotate. As roller clutch axle assembly 144 rotates, it engages with roller shaft 44. Thus, with motor 56 rotating in the counter-clockwise direction, roller drive wrap spring 142 causes roller clutch axle assembly 144 to rotate. With motor 56 rotating in the clockwise direction, roller drive wrap spring 142 will not tighten, because of its orientation, and therefore will not engage with roller clutch axle assembly 144, and consequently roller shaft 44 will not rotate. Roller shaft 44 is surrounded by rollers 46 for advancing checks under printhead 38.

FIG. 4*b* illustrates a side view of the printhead drive and check advancing mechanism. As shown in FIG. 4*b*, worm assembly 122 is centered below worm ratchet assembly 130. Furthermore, FIG. 4*b* illustrates the meshing of roller drive spur gear 140, printhead shaft idler gear 150, and printhead shaft pinion gear 152. Printhead shaft idler gear 150 is provided for spacing, and directly translates the rotation from printhead idler gear 148 to printhead shaft pinion gear 152. FIG. 4*b* best illustrates printhead backlash catch 151 and roller shaft backlash catch 153. These backlash catches are of spring metal to ensure that roller shaft 44 and printhead shaft 40 do not counter rotate when motor 56 reverses rotation. FIG. 4*c* illustrates a partial view of the gear train of the embodiment shown in FIGS. 4*a* and 4*b*.

FIG. 4*d* illustrates motor encoding wheel 121. As is shown in FIG. 4*d*, motor encoding wheel 121 includes several spokes of dark plastic such that light intensity is diminished through these spokes.

FIG. 4*e* illustrates printhead encoding gear 134. As is shown, printhead encoding gear 134 is of clear plastic, and includes two areas of dark plastic. As shown in FIG. 4*f*, light from LED 124, which is reflected off of reflector 126, passes through these holes. Printhead 38 is always placed in a home position after it has been moved, resulting in light passing through printhead encoding gear 134 through dark areas 160 or 162. In this way, the information from LED 124 generated by motor encoding wheel 121, which provides information on motor shaft 57 position, and therefore roller shaft 44 when printhead shaft 40 is not being rotated, is received by photodetector 128.

The light alternately passing through dark areas 160 and 162 indicates the position of printhead shaft 40. As can be seen in FIG. 4*e*, dark areas 160 and 162 are of different sizes, and therefore the number of light pulses at a given amplitude received by photodetector 128 will be different depending on the position of printhead 38. In this way, regardless of voltage variation and therefore motor speed variation, the number of motor encoding wheel 121 counts per dark area 160 to that of dark area 162 will always be different. These different counts determine which side of printhead shaft 40 printhead 38 is on.

This information on which end of printhead shaft 40 printhead 38 is on is used to control bi-directional printing as printhead 38 translates across the face of the check.

The Ink Cartridge

FIG. 5 is a top view of a particular embodiment of ink cartridge 12 according to the present invention. As shown in FIG. 5, ink cartridge 12 encloses an ink bladder 300. Ink bladder 300 is filled with a liquid ink through ink fill hole 302. Ink fill hole 302 allows ink to be filled into ink bladder 300 through bladder outlet tube 304. Bladder outlet tube 304 allows ink to flow from ink bladder 300 to a pump inlet chamber 306. Pump inlet chamber 306 is adjacent to an inlet chamber orifice 308. Inlet chamber orifice 308 is coupled to an inlet chamber diaphragm 310. Inlet chamber diaphragm 310 is separated from pump diaphragm 312 by pump chamber 314.

Pump inlet chamber 306 is separated from an outlet chamber 316 by inlet/outlet separator wall 318. Furthermore, outlet chamber 316 is separated from pump chamber 314 by outlet chamber diaphragm 320 and outlet orifice 322. Ink travels from outlet chamber 316 through outlet tube 324. Outlet tube 324 extends to end fixture 326. End fixture 326 has a passage which allows ink to travel from outlet tube 324 to on/off switch chamber 328. End fixture 326 is capped by a end ink stopper 330. Ink flows out of on/off switch chamber 328 through an on/off switch insertion needle 332. On/off switch insertion needle 332 is held by on/off switch housing 334, which will be discussed below.

A gravity valve 335 seals ink bladder 300 whenever ink cartridge 12 is oriented such that gravity would allow ink flow to pump inlet chamber 306. Gravity valve 335 is a ball and O-ring, such that mating of the ball and O-ring due to gravity, prevents ink flow.

In operation, with ink bladder 300 full of ink, the user fills the ink tube by depressing a prime button 336. By depressing prime button 336, ink tube 34 is filled after initial insertion of ink cartridge 12 or if air voids become trapped within printhead 38 or ink tube 34. By pumping prime button 336, air is expelled through printhead sensor orifice plate 84. Furthermore, ink is forced from pump chamber 314 to pump outlet chamber 316. As prime button 336 is released, pump diaphragm 312 draws ink from pump inlet chamber 306, via inlet chamber orifice 308, which in turn draws ink from ink bladder 300 through ink bladder outlet tube 304. In this manner, ink has been ejected on the forward stroke of prime button 336 and pump chamber 314 is refilled on the release stroke.

Pump diaphragm 312 acts as a spring to allow forward stretch and therefore return of prime button 336 to its normal position, and also serves to force ink in and out of pump chamber 314. During normal operation, with printhead 38 printing, printhead 38 exerts a positive pressure onto ink cartridge 12 which allows ink to flow from ink bladder 300 through pump inlet chamber 306, to pump chamber 314, into outlet chamber 316, and through outlet tube 324.

The Print Cap Switch

Figure 6B:
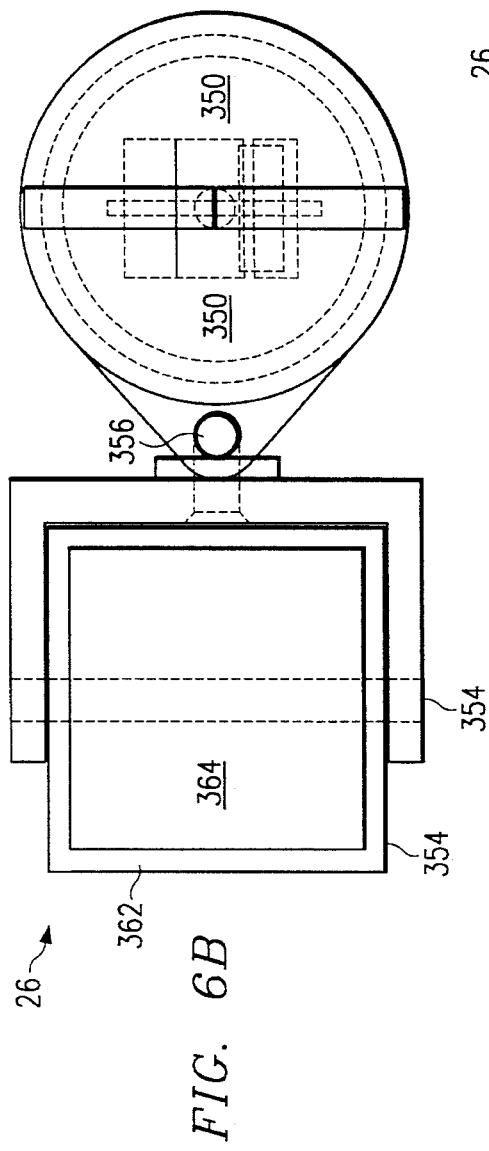
FIGS. 6a through 6c illustrate various views of a particular embodiment of an on-off switch according to the teachings of the present invention.
Figure 6A:
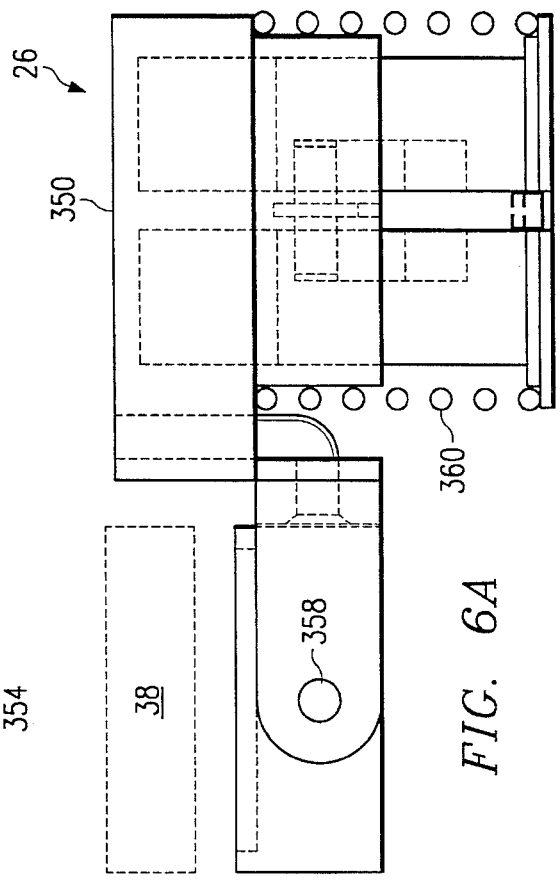
Figure 6C:
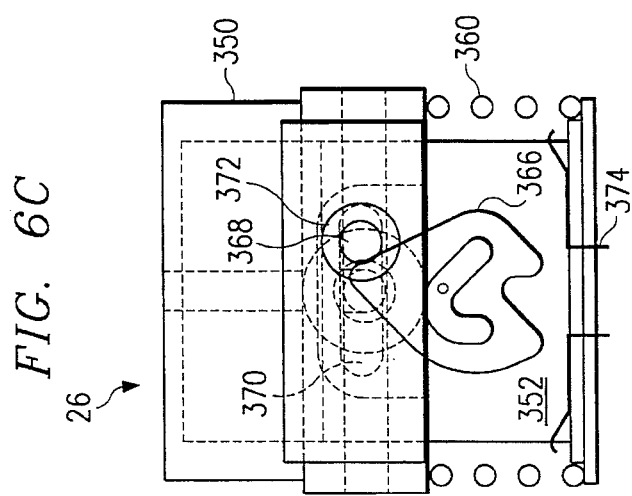

FIGS. 6a through 6c illustrate various views of a particular embodiment of a print cap switch 26 according to the present invention. By depressing print cap switch 26, printhead 38 is released and allowed to move for printing. When print cap switch 26 is depressed again, it engages printhead 38, thus locking printhead 38 into a particular location while the unit is not printing.

A print top 350 extends through top case 18 for access by the user. A print cap base 352 supports all components of print cap switch 26. An X-Y yoke assembly 354 is attached to print top 350 by an X-Y yoke attachment 356. An X-Y yoke spindle 358 allows X-Y yoke assembly 354 to rotate such that it is parallel to printhead 38 when mated. The location of printhead 38 is shown in FIG. 6a, directly above X-Y yoke assembly 354. X-Y assembly 354 is engaged or disengaged from printhead 38 by depressing print top 350, which is supported by a print cap switch spring 360.

X-Y yoke assembly 354 includes a print cap grommet 362 and a print cap absorber 364. Print cap grommet 362 seals around ink sensor orifice plate 84 to ensure that contact between printhead 38 and X-Y yoke assembly 354 occurs without undue force. Furthermore, print cap grommet 362 aids in preventing dry-out of the ink within printhead 38, such as when the printhead is left at high temperatures for long periods of time and in preventing excessive emission of ink if user over primes the printhead 38 via prime button 336. Print cap absorber 364 is made of an absorbent material, such as cotton, and absorbs any overflow of ink from printhead 38 through ink sensor orifice plate 84. Such overflow could occur because of excessive priming, abnormal environmental conditions, or harsh transportation of the unit.

FIG. 6c best illustrates the latching mechanism of print cap switch 26. A print cap cam 366 allows print cap switch 26 to latch at the bottom of the switch travel. In this way, X-Y yoke assembly 354 is kept below printhead 38 during print operations. Furthermore, print cap cam 366 is latched when printhead 38 is moved away from its home position (during print operations) to prevent damage to printhead 38 which may result from inadvertent redepressing of print cap switch 26 during print cycles.

A cam pin 368 travels horizontally within a cam pin hole 370 such that print cap switch 26 is latched at the bottom of its travel. A cam pin housing 372 surrounds cam pin 368 and allows rotation and translation of cam pin 368 within cam pin hole 370. An electrical contact 374 is used to provide an electrical indication that print cap switch 26 has been depressed.

The On/Off Switch

Figure 7B:
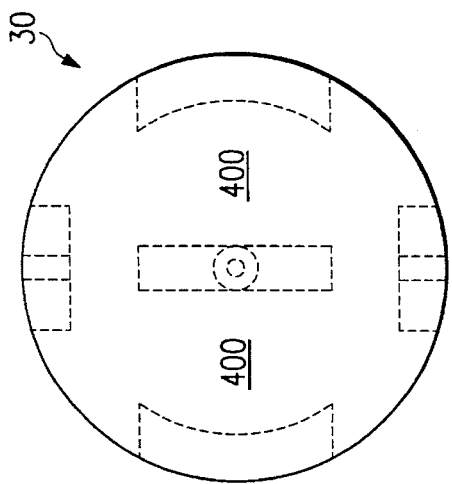
FIGS. 7a through 7c illustrate various views of a particular embodiment of a print cap assembly according to the teachings of the present invention.
Figure 7A:
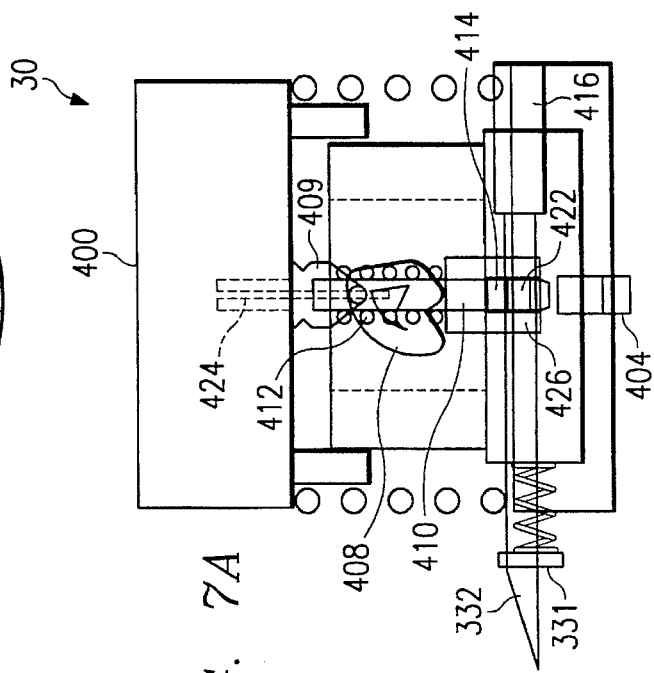
Figure 7C:
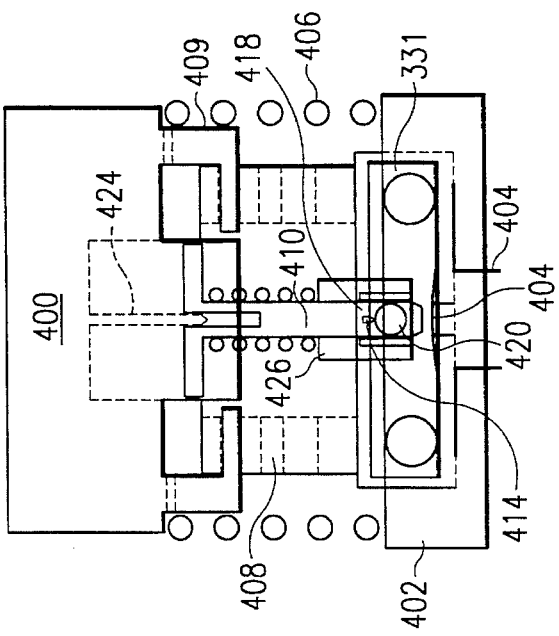

FIGS. 7a through 7c illustrate various views of a particular embodiment of an on/off switch 30 according to the teachings of the present invention. An on/off switch top 400 extends through top case 18 for access by a user. The various components of on/off switch 30 are supported by on/off switch base 402. Electrical contacts 404 are used to indicate that on/off switch 30 has been engaged and enables unit power up, and passes an electrical signal for indication of ink cartridge 12 insertion and standing wave sensor. Furthermore, on/off switch 30 opens needle valve 410, to be discussed below, which allows ink to flow from ink cartridge 12 to printhead 38. Other valves, such as pinchoff, solenoid, and diaphragm valves, may also be used without departing from the intended scope herein.

On/off switch 30 is supported by on/off spring 406. Once depressed, cam guide support 409 rotates and latches at the bottom of the travel of on/off cam 408, thus holding power on and opening needle valve 410. When on/off switch 30 is redepressed, thus turning off the unit, needle valve spring 412 turns off the needle valve 410. Furthermore, when on/off switch 30 is depressed to turn power on to the unit, on/off cam 408, in connection with electrical contacts 404, places a potential on needle 332, thus allowing for transmission of an electrical signal from needle 332 to ink sensor orifice plate 84 through the ink. Contact could also be made otherwise, such as by including a dedicated contact rather than needle 332. With this electrical signal through the ink, any air gaps will be detected as a break in the circuit. If no air gap exists, a standing wave is set-up through the ink, thereby electrically oscillating the molecules and effectively lowering the freezing point of the ink, for use in low temperature applications.

Furthermore, this potential applied to needle 332 is subsequently applied to an ink cartridge insertion switch 331, such that when ink cartridge 12 is inserted, this circuit is closed indicating ink cartridge 12 has been inserted.

A needle valve orifice 414 is provided through which ink passes into ink tube 34 through needle valve 410. Ink tube 34 is attached to on/off switch 30 via ink tube attachment 416. Insertion needle 332 inserts into ink cartridge 12 to allow flow from ink cartridge 12 through needle valve 410 to ink tube 34. Needle valve seals 418 and 420 are used to prevent air from entering a needle valve ink chamber 422, and prevent ink from leaking out of needle valve 410. Needle valve 410 is guided into needle valve chamber 422 through the top and bottom needle valve seals 418 and 420 by a top needle valve guide 424 and a bottom needle valve guide 426.

The Check Register

Figure 8:
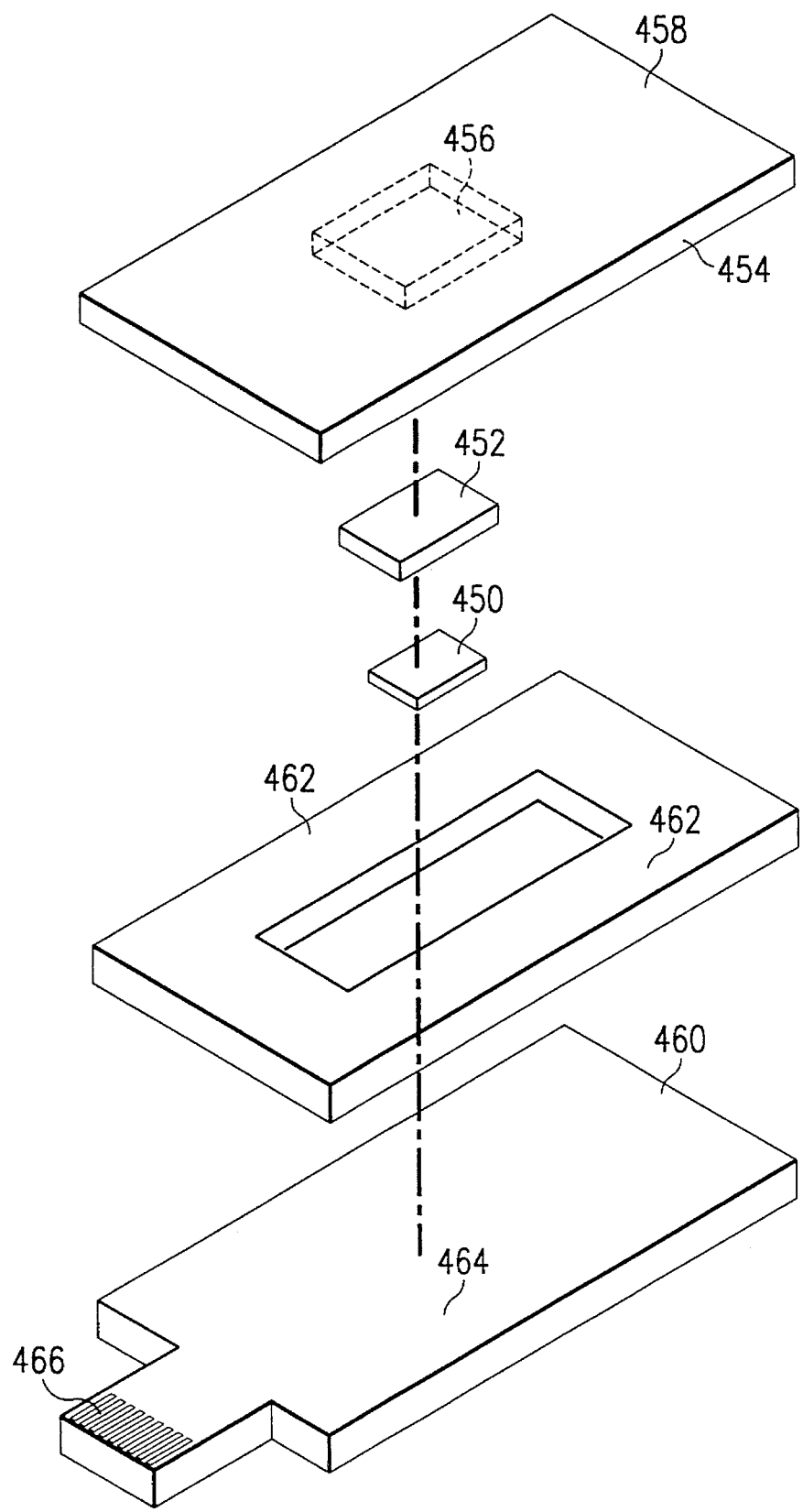
FIG. 8 illustrates an exploded view of a particular embodiment of a check register memory assembly according to the teachings of the present invention.

FIG. 8 illustrates an exploded view of one embodiment of check register 16 according to the present invention. As discussed above, check register 16 is a serial EEPROM and housing used for storing transactional information entered into electronic checkbook 10.

As shown in FIG. 8, check register 16 includes an integrated circuit memory 450. This memory is, for example, a serial EEPROM, and may be of many technologies, including CMOS or NMOS. It should be understood that other memories may be used without departing from the intended scope of the present invention. Memory 450 is covered with an epoxy cover 452. Memory 450 and epoxy cover 452 are housed within top PCB 454, which includes a cutout 456 in which memory 450 resides. Top PCB 454 is clad with copper, 458, to provide an electrostatic and electromagnetic shield. A bottom PCB 460 is bonded to top PCB 454 by conductive polymer glue 462. Conductive polymer glue 462 protects the memory from side entrance of electrostatic or electromagnetic effects. Furthermore, the conductive glue shields memory 450 from environmental conditions such as humidity. Bottom PCB 460 is clad with copper 464, which acts as an electrostatic and electromagnetic shield. Finally, edge connector 466 is an electrical connector for connecting check register 16 to the other circuits of electronic checkbook 10. The PCB material may be fiberglass on other composites, such as mylar.

Check register 16 is removable, and thus allows for expansion and for permanent storage of the information in check register 16, just as a conventional check register.

The Statement Strip

Statement strip 20 is provided for reconciliation of data entered into electronic checkbook 10 with that maintained by a financial institution, for example a bank on which the checks are drawn. Statement strip 20 includes a plastic holder 480 for holding a recording strip 482. Recording strip 482 holds information, such as monthly check transaction information. Other information which may be stored on recording strip 482 includes information from a financial institution, such as withdrawals, deposits, interest, and charges. Recording strip 482 may comprise, for example, a magnetic recording strip, a laser or optical recording strip, or strips using other recording technologies, such as infrared or ultraviolet, electric field or capacitive, or biological or organism technologies.

A plastic encapsulant 484, such as a clear piece of plastic, is placed over the recording strip to protect recording strip 482. Finally, an identifier 486 may be placed on recording strip 482. Identifier 486 may comprise, for example, the name registered on the account to which the data on the recording strip corresponds, the account number, or other identification information, as well as a proprietary data word(s) to ensure this strip is used only with a particular unit.

Electronic System

Figure 10A:
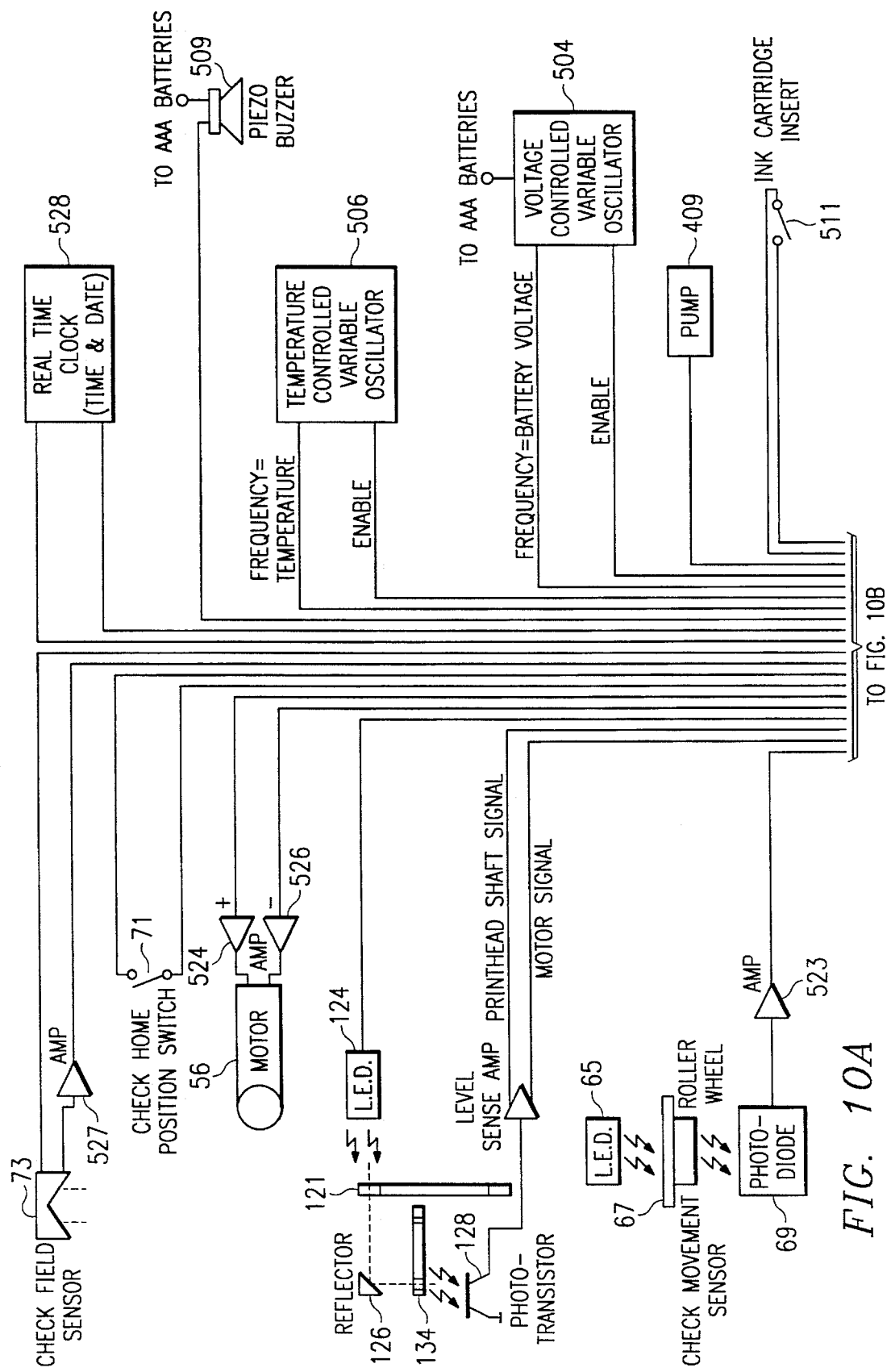
FIG. 10 is a block diagram of a particular embodiment of an electronic system for an electronic checkbook and printing mechanism according to the present invention.
Figure 10B:
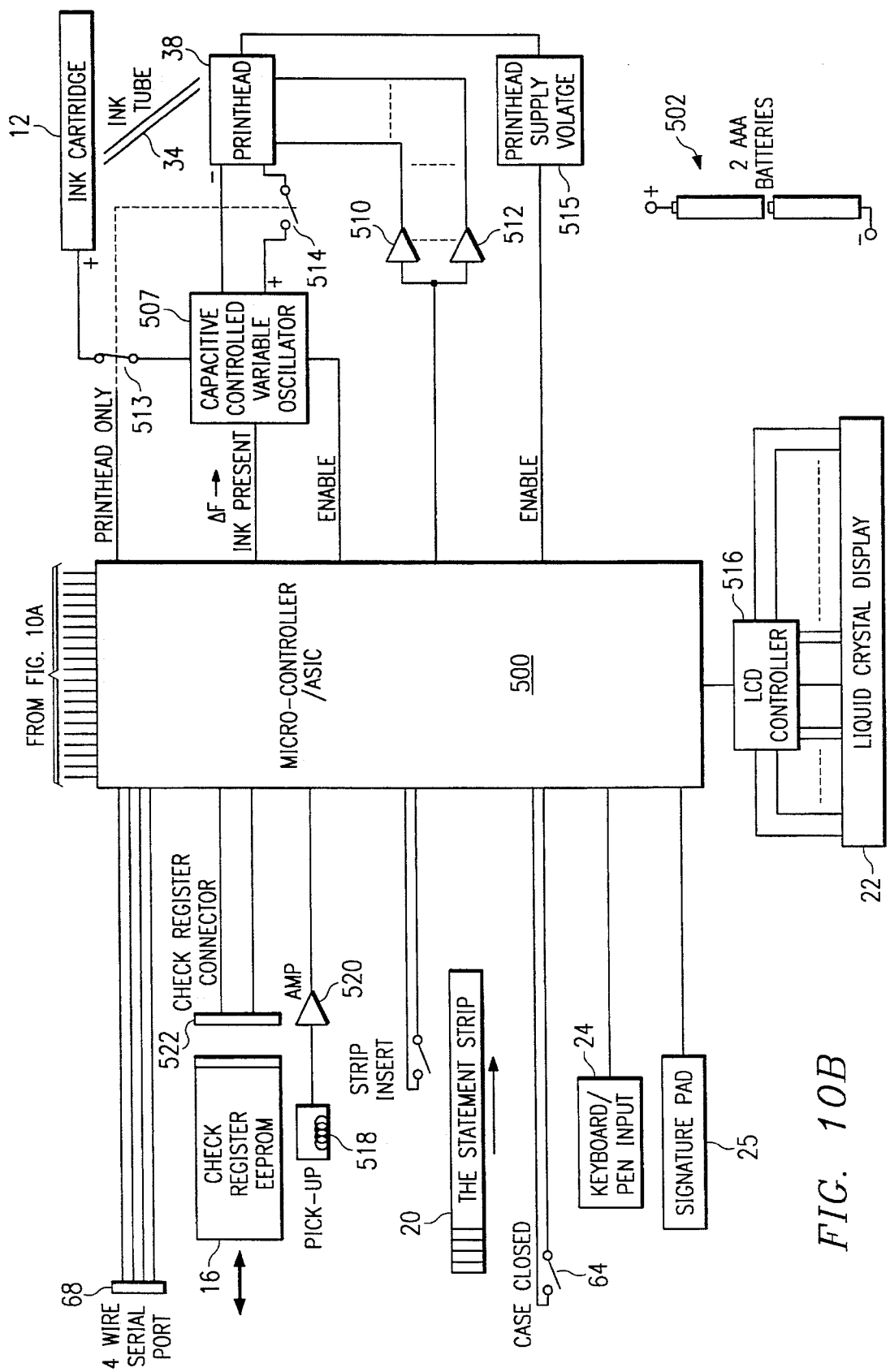

FIG. 10 is a block diagram of an electronic system for controlling electronic checkbook 10 and printing mechanism according to the present invention. As shown in FIG. 10, a controller, preferably a microcontroller or ASIC 500 is used to control the various components of electronic checkbook 10 and printing mechanism. In a particular embodiment, microcontroller 500 comprises a Motorola 68HC05, it being understood that other microcontrollers or processing devices or custom integrated circuits can be used without departing from the intended scope herein.

Power is supplied by batteries 502 which supply power for the electronic components. Batteries 502 may comprise two AAA 1.5 volt batteries. Other batteries may also be used without departing from the intended scope herein. The use of two AAA batteries provides the important technical advantage of lightweight and miniature size. Microcontroller 500 is coupled to and enables voltage controlled variable oscillator 504 and temperature controlled variable oscillator 506. These oscillators provide clock signals of frequencies proportional to the voltage and temperature, such that if the power from batteries 502 is too low or if the temperature is too low, the frequency of these oscillators will change respectively and be detected by microcontroller 500. These oscillators are enabled only at powerup and before printing to conserve power.

This change in frequency, or delta F, will be directly proportional to the change in voltage or temperature, such that a direct reading can be applied to the LCD, thereby informing the user of too low batteries to operate motor 56, or too low of a temperature for printhead 38 to print, i.e. the temperature is below the freezing point of the ink.

The presence of ink cartridge 12 is sensed by ink cartridge insertion switch 511.

A capacitive controlled variable oscillator 507, which is enabled by microcontroller 500, is coupled between ink cartridge 12 and printhead 38. In particular, oscillator 507 is coupled between needle 332 and ink filter sensor plate 80. Oscillator 507 is also coupled between ink filter sensor plate 80 and ink sensor orifice plate 84. The capacitive controlled oscillator 507 senses ink based on the position of switches 513 and 514 (which may be internal to microcontroller 500). With switch 513 closed, oscillator 507 generates a frequency that changes when air is in ink tube 34. With switch 514 closed, oscillator 507 generates a frequency that changes if air is present between ink filter sensor plate 80 and ink sensor orifice plate 84. When ink voids are sensed by oscillator 507, a micropump 409 can be activated to pump ink from ink cartridge 12 to printhead 38, until no voids are sensed or an alarm will sound indicating to the user the need to depress prime button 336 on ink cartridge 12. Oscillator 507 is enabled only before printing and at power-up to conserve power.

The capacitive controlled oscillator 507, providing no air is within ink tube 34, provides an electrical standing wave from needle 332 to ink sensor orifice plate 84, to aid in the printing operation at lower temperatures. Control of printing is provided through printhead cable 36 via drivers 510 through 512 in conjunction with printhead supply voltage 515.

LCD display 22 is controlled by microcontroller 500 through LCD controller 516. Similarly, input device 24 and signature pad 25 are controlled by microcontroller 500. The microcontroller also senses case opening through case open sensor 64. Statement strip 20 is read by a magnetic pick-up 518, in this particular embodiment, but may also be an optical, capacitive or other such type pick-up, which transmits the recovered or retrieved information through amplifier 520 to microcontroller 500. Check register 16 is coupled to microcontroller 500 through check register connector 522. Also, serial port 68 is input to microcontroller 500 for communications outside of electronic checkbook 10.

Motor 56 is controlled by microcontroller 500 through amplifiers 524 and 526. The location of printhead 38 is read by microcontroller 500. As discussed, LED 124 emits light through motor encoding wheel 121 which is reflected off reflector 126, through printhead encoding gear 134 and onto photodetector 128. LED 124 is coupled to microcontroller 500, as is photodetector 128. Microcontroller 500 analyzes the pulses output by photodetector 128 and determines the position of printhead 38. This information is used to control motor 56 for positioning of printhead 38. Furthermore, this information, when motor 56 is rotating in the opposite direction, is used to determine roller position, and thus check position relative to printhead 38.

Microcontroller 500 drives LED 65 which emits light through the encoding wheel of check movement sensor 67. This light is received by photodiode 69 and transmitted to microcontroller 500 through an amplifier 523.

A real time clock 528 is coupled to microcontroller 500, for use in displaying time and automatic date to the user, and printed onto the check. A piezo buzzer 509 is also driven by microcontroller 500.

Microcontroller 500 also reads check home position sensor 71 to determine if the check is in the home position before printing. Check field sensor 73 via Amp 527 is also read by microcontroller 500 to determine information field positions on checks, for control of character print location in combination with information from motor encoding wheel 121 and printhead encoding gear 134.

Software Flow Diagram

Figure 11A:
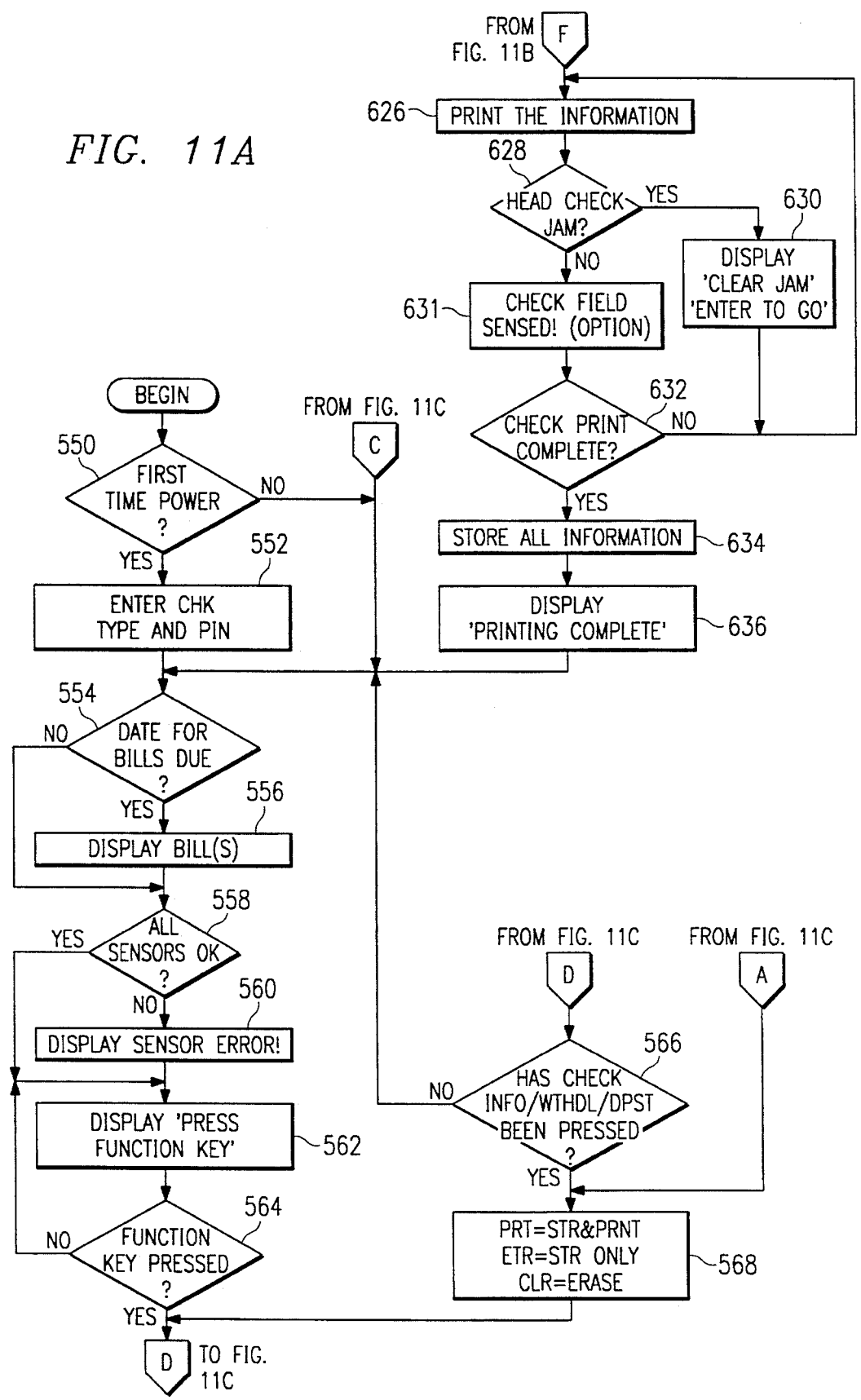
FIG. 11 is a flow diagram of a particular embodiment of software for an electronic checkbook and printing mechanism according to the present invention.
Figure 11B:
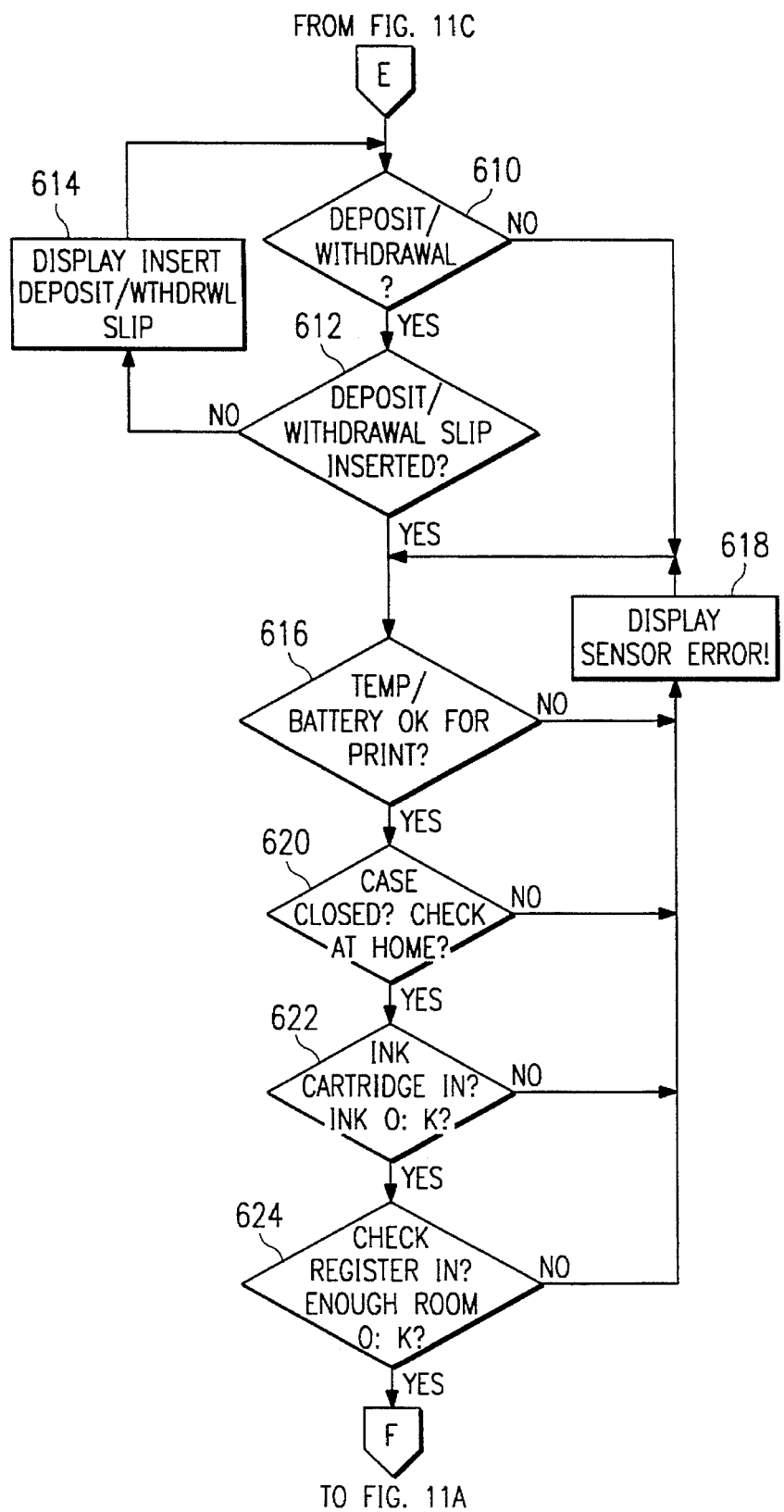

FIG. 11 provides a software flow diagram for control of electronic checkbook 10 and the printing mechanism according to the teachings of the present invention. The software for which FIG. 11 is a flow diagram resides within microcontroller 500, and is used to control the operation of electronic checkbook 10.

Electronic checkbook 10 allows for several functions to be performed. As shown in FIG. 1, these functions include check number, to, amount, memo, balance, deposit, withdrawal, register, menu, calculator, clear and enter. However, these keys are but an example of the multitude of various named function keys that may be used, and hence the operation performed, within electronic checkbook 10. Once a function key is pressed, electronic checkbook 10 enters the function mode and any of these function keys can be re-pressed, such that no duplicate function will be allowed. If, however, several function keys are pressed, the first function key will be executed.

By pressing the "check number", the checkbook requests that the check number be entered. Likewise, by pressing "to", electronic checkbook 10 requests entry of the payee By pressing "amount", electronic checkbook 10 asks for the amount of the check to be written. The memo function allows for entry of a memorandum on the check. Note, once a function key of the type, "Check Number", "To", "Amount", "Memo", is pressed, the remaining functions of the above types will automatically follow, querying the user for the appropriate information. This alleviates the necessity for depressing further function keys of the above type.

Pressing the "balance" key results in a display of the current balance in the check register. Pressing "deposit" or "withdrawal" requests entry of either a deposit or withdrawal. Furthermore, a blank deposit or withdrawal slip can be inserted in electronic checkbook 10, after which the deposit or withdrawal amounts be printed on the appropriate forms, for a hard copy record, if the "Print" key is depressed.

By pressing the "register" button, the register function is entered and information in check register 16 can be reviewed. By pressing the "calculator" button, calculator functions can be performed. The "enter" key is used to enter data into electronic checkbook 10 once it has been completed, and the clear button allows such data to be cleared.

Processing begins at decision block 550, where it is determined whether it is the first time that electronic checkbook 10 has ever been powered up. If the answer is "Yes", then the user is asked at block 552 to enter the check type which is a code for the manufacturer of the check, and type of check. Personal identification number can also be entered. If the answer at decision block 550 is "No", or after the user has entered the check type or personal identification number, decision block 554 is encountered. Decision block 554 determines whether any bills are due on the present date. The software allows users to enter in the dates on which bills are due for purposes of block 554. If the present date is the same as the date on which the bill is due, then 556 is encountered and electronic checkbook 10 will display the bill that is due. If the answer is "No" at decision block 554, or after display of the bill that is due, decision block 558 is encountered.

Decision block 558 checks whether the various sensors described above are operative. If the answer is "No", then a sensor error display message is displayed by block 560. After the errors have been cleared, or if all the sensors are operative as decided by block 558, block 562 is encountered.

Block 562 and decision block 564 receive the input of a function key. If a function key is not depressed, the software loops back to block 562 from block 564 until such a key is pressed. If a function key is pressed, then block 565 is encountered. Block 565 triggers execution of that function key. As shown in the flow diagram, the following functions will be executed following block 565 depending on whether that function key was pressed: check #, to, amount, memo, deposit, withdrawal, balance, register, statement, calculate, and clear.

If "balance" has been pressed, blocks 574 and 576 will be executed, displaying the balance. After this, the software cycles through to decision block 566. If the "register" function has been pressed, blocks 578 and 580 will be executed, displaying previous checks pursuant to user instructions. After completion of the register function, block 566 is encountered.

If the "enter" function has been pressed, blocks 582 and 584 are encountered. All information entered through the input device will be stored, and then block 554 will be encountered.

If the "deposit" function has been pressed, then blocks 586 and 588 will be encountered, resulting in entry of deposit information. This allows a record of deposit to be maintained. After block 588, a deposit/withdrawal routine will be executed, as will be discussed. If the withdrawal function has been pressed, then blocks 590 and 592 will be encountered. These execution blocks allow entry of withdrawal information. After entry of the withdrawal information, the withdrawal routine will be executed, as will be discussed.

If the menu key is depressed, followed by the selection of the statement function, statement function has been pressed, then blocks 594 and 596 will be executed. These blocks allow entry of information from a bank statement for calculation of a new balance at block 598. After block 598, block 566 will be encountered.

Furthermore, "menu" allows for other functions such as setting of the real time clock, entry of the personal identification number, or other functions related to checking.

A calculator mode is also provided. If a calculator function has been pressed, then blocks 600 and 602 will be encountered, executing the calculator function of electronic checkbook 10. After this has been completed, then block 566 will be encountered.

If the "clear" function has been pressed, then block 604 and 606 will be executed, resulting in clearing of the last displayed information. After this clearing, block 554 will be encountered.

If the print function has been executed, then block 608 will be encountered, beginning the print routine. After block 608, block 610 is encountered. Block 610 also begins the deposit/withdrawal routine, referenced above. Decision block 566 determines whether withdrawal, deposit, or check information, such as check number, memo, amount, or payee, function have been pressed. If they have been, then execute block 568 is encountered. If they have not been pressed, then block 554 is encountered. If at block 568 withdrawal, deposit, or print has been pressed, then block 610, which begins a print routine, is encountered. If check information functions have been pressed, then blocks 565, 570 and 572 are encountered. These blocks, along with block 568, display and allow input of the appropriate information and store the information.

Block 610 is a decision block which determines whether a deposit or withdrawal function has been pressed. If either deposit or withdrawal function has been pressed, then decision block 612 allows for entry of deposit or withdrawal slip into electronic checkbook 10 for printing of a permanent record. If these slips have not been entered, then block 614 is encountered which requests their insertion.

If the deposit/withdrawal slips have been entered, then block 616 is encountered. Block 616 is also encountered if at decision block 610 is determined that neither the deposit nor withdrawal function key has been pressed. Decision block 616 reads the temperature sensor and battery sensor for printing operability. If the printer is not operable because of low temperature or low battery power, then block 618 is encountered in which a sensor error is displayed. After the sensor error is displayed, decision block 616 is re-encountered until the temperature or battery problem is remedied. If at block 616 is determined that the temperature and battery sensors permit printing, then block 620 is encountered. Decision block 620 checks to ensure that the case is closed. If the case is not closed, then decision block 618 is encountered. If the case is closed, then decision block 622 is encountered. Decision block 622 determines whether the ink cartridge is inserted, and whether there are air gaps in the inktube 34 and ink in the printhead 38. If ink cartridge 12 is not inserted, or there are ink voids, then block 618 is encountered. If the ink cartridge 12 is inserted, and there are no ink voids, then decision block 624 is encountered, in which it is determined whether the check register 16 is inserted. If the check register 16 is not inserted, then execution block 618 is encountered.

If the check register 16 is inserted, then information is printed at block 626. The software also includes the ability to print bar codes on the checks for subsequent identification and/or check processing. During printing, block 628 is encountered, which checks to see whether there is a head or check jam. If such a jam exists, then block 630 is encountered which stops printing and displays a clear jam message. Block 628 is encountered after block 630 until the jam is remedied. If no jam is determined by block 628, then execution block 631 and decision block 632 are encountered. Execution block 631 senses the location of information fields on checks being printed. This information is used by microcontroller 500 to position the characters to be printed on the check. Decision block 632 checks to see whether the check printing is complete. If the answer is "No", then block 626 is encountered. If check printing is complete, then block 634 is encountered in which all information is stored. After the information has been stored, a printing complete message is displayed by block 636, after which block 554 is encountered.

Although the present invention has been described in detail, it should be understood that various changes, substitutions, and alterations can be made without departing from the spirit and scope of the invention, as defined solely by the appended claims.

What is claimed is:

1. A hand-held electronic checkbook, comprising:

a case, said case including a cavity for storage of a plurality of checks;

an input device integral with said case, said input device for inputting information to said electronic checkbook, said information including data for writing checks;

a display device integral with said case, said display device for displaying data input to or generated by said electronic checkbook;

a printing mechanism for printing checks, said printing mechanism comprising:

a single motor including a motor shaft operable to turn in a first direction and a second direction;

a printhead, said printhead for printing on said checks;

a printhead shaft to which said printhead is translationally engaged, such that rotation of said printhead shaft in a single rotational direction causes translation of said printhead back and forth along said printhead shaft for printing on said checks;

a roller shaft extending over said checks, such that rotation of said roller shaft advances said checks under said printhead for printing by said printhead and out of said electronic checkbook; and a transmission coupled to said motor shaft, said printhead shaft, and said roller shaft, said transmission causing rotation of said printhead shaft only when said motor shaft is turning in said first direction, and causing rotation of said roller shaft only when said motor shaft is turning in said second direction; and an electronic control system, including a controller and memory for controlling said printing mechanism, said input device, and said display device, and for maintaining transactional records associated with said checks.

2. The electronic checkbook of claim 1, wherein said printhead comprises an inkjet printing printhead.

3. The electronic checkbook of claim 2 and further comprising an ink sensor for sensing the presence of ink within said printhead.

4. The electronic checkbook of claim 2, wherein said printhead includes:

an ink filter sensor plate for filtering said ink, said ink filter sensor plate being electrically conductive; and an ink sensor orifice plate through which jets of ink are expelled for printing, said ink sensor orifice plate being electrically conductive, such that ink presence can be sensed between said ink filter sensor plate and said ink orifice sensor plate.

5. The electronic checkbook of claim 1, and further comprising:

an ink cartridge slidably engageable into said case, said ink cartridge for storing ink to be supplied to said printhead;

a valve coupled to said ink cartridge and operable to control flow of ink from said ink cartridge to said printhead; and an ink tube coupled between said valve and said printhead for transmitting ink to said printhead.

6. The electronic checkbook of claim 5, wherein said ink cartridge includes:

an ink bladder for storing ink;

an inlet chamber for drawing ink from said ink bladder;

a primer pump and pump chamber operable to draw ink from said inlet chamber into said a pump chamber, said pump chamber separated from said inlet chamber by an inlet chamber diaphragm such that ink cannot flow from said pump chamber to said inlet chamber;

an outlet chamber for drawing ink from said pump chamber, said outlet chamber separated from said pump chamber by an outlet chamber diaphragm such that ink cannot flow from said outlet chamber to said pump chamber.

7. The electronic checkbook of claim 5, wherein said printhead includes an electrically conductive ink sensor orifice plate operable to receive an electrical signal through ink in said ink tube, such that air gaps in said ink tube can be sensed.

8. The electronic checkbook of claim 5, wherein said printhead includes an electrically conductive ink sensor orifice plate operable to receive an electrical signal through ink in said ink tube, such that the freezing point of said ink is effectively lowered.

9. The electronic checkbook of claim 1, and further comprising a position sensor for sensing positions of said printhead shaft and said motor shaft.

10. The electronic checkbook of claim 9, wherein said position sensor comprises:

a light emitting diode;

a motor encoding wheel coupled to said motor shaft, said motor encoding wheel operable to intermittently reduce an intensity of light from said light emitting diode as said motor encoding wheel rotates;

a printhead encoding gear coupled to said transmission, said printhead encoding gear operable to intermittently reduce the intensity of light from said light emitting diode as said printhead encoding gear rotates; and a photodetector operable to receive light from said light emitting diode passed through said motor encoding wheel and said printhead encoding gear and to output position signals to said controller in response to the received light.

11. The electronic checkbook of claim 10, and further comprising a reflector, such that light from said light emitting diode is reflected through said printhead encoding gear after passing through said motor encoding wheel.

12. The electronic checkbook of claim 10, wherein:

said motor encoding wheel includes a plurality of spokes, such that the intensity of light from said light emitting diode is intermittently reduced by said spokes as said motor encoding wheel rotates; and said printhead encoding gear includes a plurality of dark areas, such that light from said light emitting diode is intermittently reduced by said darkening as said printhead encoding gear rotates.

13. The electronic checkbook of claim 1, wherein said transmission comprises:

a worm assembly coupled to a motor pinion on said motor shaft;

a ratchet shaft;

a worm ratchet assembly engaged with said worm assembly, said worm ratchet assembly including a one way drive ratchet;

a ratchet pawl disc coupled to said ratchet shaft and engageable with said one way drive ratchet, such that said ratchet pawl disc rotates only when said motor shaft turns in said first direction, rotation of said ratchet pawl disc causing rotation of said ratchet shaft;

idler gears coupled to said ratchet shaft for turning said printhead shaft when said ratchet shaft rotates;

a roller clutch assembly coupled to said roller shaft; and a roller drive spur gear and roller drive wrap spring rotatably engaged with said worm assembly, said roller drive wrap spring oriented such that said roller drive wrap spring tightens on said roller clutch assembly and causes rotation of said roller shaft only when said motor shaft turns in said second direction.

14. The electronic checkbook of claim 1, and further comprising a removable non-volatile memory for storing transactional information.

15. The electronic checkbook of claim 11, and further comprising a statement strip reading device integral with said case, said statement strip reading device operable to read information, including transactional information, recorded on a statement strip, such that information from said statement strip can be reconciled with information in said removable non-volatile memory.

16. The electronic checkbook of claim 1, wherein said electronic control system is operable to control said printhead to print bar codes on said checks.

17. A printing mechanism, comprising:

a single motor including a motor shaft operable to turn in a first direction and a second direction;

a printhead, said printhead for printing;

a printhead shaft to which said printhead is translationally engaged, such that rotation of said printhead shaft causes translation of said printhead back and forth along said printhead shaft for printing;

a roller shaft extending over items to be printed, such that rotation of said roller shaft advances said items under said printhead;

a transmission coupled to said motor shaft, said printhead shaft, and said roller shaft, said transmission causing rotation of said printhead shaft only when said motor shaft is turning in said first direction, and causing rotation of said roller shaft only when said motor shaft is turning in said second direction; and an electronic control system, including a controller and memory for controlling said printing mechanism.

18. The printing mechanism of claim 17, wherein said printhead comprises an inkjet printing printhead.

19. The printing mechanism of claim 18, and further comprising an ink sensor for sensing the presence of ink within said printhead.

20. The printing mechanism of claim 18, wherein said printhead includes:

an ink filter sensor plate for filtering said ink, said ink filter sensor plate being electrically conductive; and an ink sensor orifice plate through which jets of ink are expelled for printing, said ink sensor orifice plate being electrically conductive, such that ink presence can be sensed between said ink filter sensor plate and said ink orifice sensor plate.

21. The printing mechanism of claim 17, and further comprising:

an ink cartridge for storing ink to be supplied to said printhead;

a valve coupled to said ink cartridge and operable to control flow of ink from said ink cartridge to said printhead; and an ink tube coupled between said valve and said printhead for transmitting ink to said printhead.

22. The printing mechanism of claim 21, wherein said ink cartridge includes:

an ink bladder for storing ink;

an inlet chamber for drawing ink from said ink bladder;

a primer pump and pump chamber operable to draw ink from said inlet chamber into said a pump chamber, said pump chamber separated from said inlet chamber by an inlet chamber diaphragm such that ink cannot flow from said pump chamber to said inlet chamber; and an outlet chamber for drawing ink from said pump chamber, said outlet chamber separated from said pump chamber by an outlet chamber diaphragm such that ink cannot flow from said outlet chamber to said pump chamber.

23. The printing mechanism of claim 21, wherein said printhead includes an electrically conductive ink sensor orifice plate operable to receive an electrical signal through ink in said ink tube, such that air gaps in said ink tube can be sensed.

24. The printing mechanism of claim 21, wherein said printhead includes an electrically conductive ink sensor orifice plate operable to receive an electrical signal through ink in said ink tube, such that the freezing point of said ink is effectively lowered.

25. The electronic checkbook of claim 17, and further comprising a position sensor for sensing positions of said printhead shaft and said motor shaft.

26. The printing mechanism of claim 25, wherein said position sensor comprises:

a light emitting diode;

a motor encoding wheel coupled to said motor shaft, said motor encoding wheel operable to intermittently reduce an intensity of light from said light emitting diode as said motor encoding wheel rotates;

a printhead encoding gear coupled to said transmission, said printhead encoding gear operable to intermittently reduce the intensity of light from said light emitting diode as said printhead encoding gear rotates; and a photodetector operable to receive light from said light emitting diode passed through said motor encoding wheel and said printhead encoding gear and to output position signals to said controller in response to the received light.

27. The printing mechanism of claim 26, and further comprising a reflector, such that light from said light emitting diode is reflected through said printhead encoding gear after passing through said motor encoding wheel.

28. The printing mechanism of claim 26, wherein:

said motor encoding wheel includes a plurality of spokes, such that the intensity of light from said light emitting diode is intermittently reduced by said spokes as said motor encoding wheel rotates; and said printhead encoding gear includes a plurality of dark areas, such that the intensity of light from said light emitting diode is intermittently reduced by said dark areas as said printhead encoding gear rotates.

29. The printing mechanism of claim 17, wherein said transmission comprises:

a worm assembly coupled to a motor pinion on said motor shaft;

a ratchet shaft;

a worm ratchet assembly engaged with said worm assembly, said worm ratchet assembly including a one way drive ratchet;

a ratchet pawl disc coupled to said ratchet shaft and engageable with said one way drive ratchet, such that said ratchet pawl disc rotates only when said motor shaft turns in said first direction, rotation of said ratchet pawl disc causing rotation of said ratchet shaft;

idler gears coupled to said ratchet shaft for turning said printhead shaft when said ratchet shaft rotates;

a roller clutch assembly coupled to said roller shaft; and a roller drive spur gear and roller drive wrap spring rotatably engaged with said worm assembly, said roller drive wrap spring oriented such that said roller drive wrap spring tightens on said roller clutch assembly and causes rotation of said roller shaft only when said motor shaft turns in said second direction.

30. An electronic checkbook, comprising:

a case, said case including a cavity for storage of a plurality of checks;

an input device integral with said case, said input device for inputting information to said electronic checkbook, said information including data for writing checks;

a display device integral with said case, said display device for displaying data input to or generated by said electronic checkbook;

a printing mechanism for printing checks, said printing mechanism comprising:

a single motor including a motor shaft operable to turn in two directions;

an inkjet printhead and ink tube for supplying ink to said printhead, said printhead for printing on said checks and including:

an ink filter sensor plate for filtering said ink, said ink filter sensor plate being electrically conductive; and an ink sensor orifice plate through which jets of ink are expelled for printing, said ink sensor orifice plate being electrically conductive, such that ink presence can be sensed between said ink filter sensor plate and said ink orifice sensor plate, said ink sensor orifice plate also operable to receive an electrical signal through said ink for effectively lowering the freezing point of said ink;

a printhead shaft to which said printhead is translationally engaged, such that rotation of said printhead shaft causes translation of said printhead for printing on said checks;

a roller shaft extending over said checks, such that rotation of said roller shaft advances said checks under said printhead;

a transmission coupled to said motor shaft, said printhead shaft, and said roller shaft, said transmission operable to rotate said printhead shaft only when said motor shaft is turning in a first direction, and to rotate said roller shaft only when said motor shaft is turning in a second direction; and a position sensor for sensing positions of said printhead shaft and said motor shaft;

an electronic control system, including a controller and memory for controlling said printing mechanism, said input device, and said display device, and for maintaining transactional records associated with said checks, said electronic control system operable to control said printing mechanism based in part on said position sensor;

a removable non-volatile memory for storing transactional information; and a statement strip reading device integral with said case, said statement strip reading device operable to read information, including transactional information, recorded on a statement strip, such that information from said statement strip can be reconciled with information in said removable non-volatile memory.

* * * * *